US012571559B2

(12) United States Patent
Chance

(10) Patent No.: US 12,571,559 B2
(45) Date of Patent: Mar. 10, 2026

(54) INTEGRATED VENTILATION REGISTER FILTER

(71) Applicant: 1st Vision Concepts, LLC, Dunn, NC (US)

(72) Inventor: Arnold Chance, Dunn, NC (US)

(73) Assignee: 1st Vision Concepts, LLC, Dunn, NC (US)

( * ) Notice: Subject to any disclaimer, the term of this patent is extended or adjusted under 35 U.S.C. 154(b) by 288 days.

(21) Appl. No.: 17/695,547

(22) Filed: Mar. 15, 2022

(65) Prior Publication Data

US 2023/0296284 A1 Sep. 21, 2023

(51) Int. Cl.
| | |
|---|---|
| B01D 46/00 | (2022.01) |
| B01D 39/10 | (2006.01) |
| F24F 13/08 | (2006.01) |
| B01D 46/42 | (2006.01) |

(52) U.S. Cl.
CPC ............ F24F 13/085 (2013.01); B01D 39/10 (2013.01); B01D 46/0005 (2013.01); B01D 46/0028 (2013.01); *B01D 46/0032* (2013.01); *B01D 46/4263* (2013.01); *B01D 2279/65* (2013.01); *F24F 2221/22* (2013.01)

(58) Field of Classification Search
CPC .... F24F 13/085; F24F 2221/22; B01D 39/10; B01D 46/0005; B01D 46/0028; B01D 46/0032; B01D 46/4263; B01D 2279/65
USPC ......................................................... 96/225
See application file for complete search history.

(56) References Cited

U.S. PATENT DOCUMENTS

| | | | | | |
|---|---|---|---|---|---|
| 1,694,089 | A | * | 12/1928 | Wright | F24F 13/28 55/DIG. 35 |
| 3,979,006 | A | * | 9/1976 | Jurasek | B65D 19/10 206/513 |
| 5,597,392 | A | * | 1/1997 | Hawkins | F24F 13/28 55/DIG. 35 |
| 5,776,218 | A | * | 7/1998 | Enns | B01D 46/0004 55/DIG. 35 |
| 5,984,776 | A | * | 11/1999 | Berger | F24F 13/085 55/491 |
| 6,227,962 | B1 | * | 5/2001 | Orendorff | F24F 13/28 454/289 |
| 6,340,329 | B1 | * | 1/2002 | Park | F24F 13/085 454/324 |
| 6,537,146 | B1 | * | 3/2003 | Haynes | F24F 13/15 454/325 |

(Continued)

OTHER PUBLICATIONS

Hole Metals.com, https://web.archive.org/web/20200921054948/ https://www.holemetals.com/product/standard-size-wire-mesh/ (2017). (Year: 2017).*

(Continued)

*Primary Examiner* — T. Bennett McKenzie
(74) *Attorney, Agent, or Firm* — Kaufman & Canoles, P.C.

(57) ABSTRACT

A ventilation register includes a panel having a flange and a plurality of first apertures adapted to allow airflow through the panel, with each first aperture having a diameter or dimensions sufficient to allow movement of an object or entity through that first aperture. A filter is coupled to the ventilation register and has a plurality of second apertures adapted to allow airflow through the filter while inhibiting a movement of an object or entity through the filter.

18 Claims, 22 Drawing Sheets

(56)                     References Cited

U.S. PATENT DOCUMENTS

| | | | |
|---|---|---|---|
| 8,870,995 B1* | 10/2014 | Bender | B01D 46/001 |
| | | | 55/501 |
| 2003/0220068 A1* | 11/2003 | Orendorff | F24F 13/12 |
| | | | 454/290 |
| 2004/0112019 A1* | 6/2004 | Mountford | A47L 9/149 |
| | | | 55/528 |
| 2008/0085674 A1* | 4/2008 | Babiak | F24F 13/02 |
| | | | 454/237 |
| 2009/0078121 A1* | 3/2009 | Hepburn | A61L 9/16 |
| | | | 96/222 |
| 2010/0035538 A1* | 2/2010 | White | F24F 13/082 |
| | | | 454/290 |
| 2010/0307503 A1* | 12/2010 | Iwamoto | B01D 39/1623 |
| | | | 55/528 |
| 2013/0212991 A1* | 8/2013 | Albert | F24F 13/20 |
| | | | 55/385.2 |
| 2014/0011439 A1* | 1/2014 | Young | F24F 13/20 |
| | | | 454/289 |
| 2017/0314812 A1* | 11/2017 | Hurley | B01D 46/0005 |
| 2019/0024936 A1* | 1/2019 | Richie | F24F 13/085 |
| 2019/0030855 A1* | 1/2019 | Anantharamaiah | A61B 46/40 |
| 2020/0103138 A1* | 4/2020 | Ellis | F24F 13/085 |
| 2021/0346827 A1* | 11/2021 | Ostfeld | B01D 39/1623 |
| 2022/0057105 A1* | 2/2022 | Regnier | F24F 13/084 |

OTHER PUBLICATIONS

Amazon, "Floor Register Trap—Screen for Home Air Vent Filters (4" x 10"), 2-Pack," <https://www.amazon.com/Floor-Register-Trap-Screen-Vents/dp/B06WGPLB3R>, webpage available at least as early as Dec. 11, 2017 (8 pages).

* cited by examiner

INTEGRATED VENTILATION REGISTER FILTER

FIELD OF DISCLOSURE

The present disclosure relates generally to heating, ventilation, and air conditioning (HVAC) technology, and in particular to ventilation registers.

BACKGROUND

A ventilation register is a grille having moving parts, capable of being opened and closed and the air flow directed, which is part of a building's heating, ventilation, and air conditioning (HVAC) system. The placement and size of registers is critical to HVAC efficiency. Register dampers or louvers are also important and can serve a safety function. A register differs from a grille in that a damper is included. However, in practice, the terms "grille", "register", and "return" are often used interchangeably, and care must be taken to determine the meaning of the term used. Placement of registers is key in creating an efficient HVAC system. Usually, a register is placed near a window or door, which is where the greatest heat/cooling loss occurs. In contrast, returns (grilled ducts which suck air back into the HVAC system for heating or cooling) are usually placed in the wall or ceiling nearest the center of the building. Generally, in rooms where it is critical to maintain a constant temperature, two registers (one placed near the ceiling to deliver cold air, and one placed in the floor to deliver hot air) and two returns (one high, one low) will be used. HVAC systems generally have one register and one return per room.

Registers vary in size with the heating and cooling requirements of the room. If a register is too small, the HVAC system will need to push air through the ducts at a faster rate in order to achieve the desired heating or cooling. This can create rushing sounds which can disturb occupants or interfere with conversation or work (such as sound recording). The velocity of air through a register is usually kept low enough so that it is masked by background noise. (Higher ambient levels of background noise, such as those in restaurants, allow for higher air velocities.) On the other hand, air velocity must be high enough to achieve the desired temperature. Registers are a critical part of the HVAC system. If not properly installed and tightly connected to the ductwork, air will spill around the register and greatly reduce the HVAC system's efficiency. An additional problem arises from the possibility of foreign objects falling into the register, or of dirt or dust accumulating in the register. This results in blockage and alteration of the air flow. Foreign material in the register thus results in improper functioning of the HVAC system and additional noise.

There is a need for improved techniques to retrieve an object or entity that falls into a ventilation register. Further, there is a need for improved techniques to inhibit the movement of an object or entity in an HVAC system. Also, there is a need for improved techniques to install a ventilation register filter between a ventilation register and a register boot or within the ventilation register. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

According to one aspect, a ventilation register may include a panel having a flange and a plurality of first apertures. The first apertures are adapted to allow airflow through the panel. Each first aperture has a diameter or dimensions sufficient to allow movement of an object or entity through that first aperture. A filter is integrated into the ventilation register, the filter having a plurality of second apertures adapted to allow airflow through the filter while inhibiting a movement of an object or entity through the filter. A housing is coupled to the ventilation register with at least a portion of the housing disposed between the panel and the filter, the housing having side walls that form a hollow enclosure with front and back openings. The flange is positioned about a periphery of at least a portion of the side walls and defines at least a portion of the front opening. The ventilation register is adapted to be disposed in a register boot so that the register is operable to allow a flow of air through the register while inhibiting a movement of an object or entity between the register and the boot.

According to another aspect, the ventilation register may include a louver structure having at least one partially rotatable slat, with each slat having a corresponding variable aperture dependent on a rotated position of that slat so that an amount of airflow through the louver structure can be controlled. The louver structure may be disposed in the hollow enclosure and have a size and a shape that corresponds to a size and a shape of the hollow enclosure.

According to another aspect, the ventilation register may include adjustable apertures to allow airflow to be controlled. The adjustable apertures may be at least partially defined by rotatable slats. The adjustable apertures may be at least partially defined by a slidable cover.

According to another aspect, the ventilation register may include a door or a slide that may be selectively opened and closed in order to remove objects or entities that have been caught by the filter. A door or slide may be disposed in the filter. The door or slide may be disposed in the panel.

According to another aspect, the filter may define an airflow inlet.

According to another aspect, a removable insert may comprise the filter, the insert configured to fit within the housing.

According to another aspect, the filter may be permanently affixed to the ventilation register.

According to another aspect, the ventilation register and the filter may be a monolithic piece.

According to another aspect, the flange may contact a floor surface, the filter may be integrated with the housing, a ventilation register height may be defined as the distance between the distal edge of the panel and the distal edge of the filter, the register boot may have a boot depth measured from a floor surface to the bottom of the register boot, and the ventilation register height may be less than the boot depth.

According to another aspect, the filter may be made of a mesh. Each of the first apertures has a first cross-sectional area and each of the second apertures may have a second cross-sectional area that is less than one one-hundredth of the first cross-sectional area. Each of the second apertures may have a second cross-sectional area that is less than one two-hundredth of the first cross sectional area. A portion of the side walls may include the mesh.

According to one aspect, a ventilation register may include an airflow pathway having an airflow inlet and an airflow outlet and defining an airflow direction. A panel has a plurality of first apertures and a filter affixed to the panel. The filter has a plurality of second apertures. Both the panel and the filter are disposed in the airflow pathway. The panel is disposed nearer to the airflow outlet than the filter is to the airflow outlet. Each first aperture has a cross-sectional area that is normal to the airflow direction, and an average of the cross-sectional areas of the first apertures is defined as a first average cross-sectional area. Each second aperture has a cross-sectional area that is normal to the airflow direction, and an average of the cross-sectional areas of the second apertures is defined as a second average cross sectional area. An airflow control structure is provided in the airflow pathway, the airflow control structure including adjustable apertures. The adjustable apertures are adjustable between a fully open position and a fully closed position. When the adjustable apertures are adjusted to the fully open position, each adjustable aperture has a cross-sectional area that is normal to the airflow direction, and an average of the cross-sectional areas of the adjustable apertures is defined as a third average cross-sectional area. The second average cross sectional area is less than each of the first average cross-sectional area and the third average cross-sectional area. The ventilation register is adapted to be disposed in a register boot so that the register is operable to allow a flow of air through the register while inhibiting a movement of an object or entity between the register and the boot when the object or entity has a cross-sectional area that is smaller than both the first average cross-sectional area and the third average cross-sectional area, but larger than the second average cross-sectional area.

According to another aspect, the first apertures and the adjustable apertures may or may not be the same apertures.

According to another aspect, the register may be configured such that, during normal operation, the air gauge pressure measured at the airflow inlet is at least 90% of the pressure at the airflow outlet.

According to another aspect, the second apertures may have a diameter in the range of 0.5 mm to 6 mm.

According to another aspect, the second apertures may have a diameter less than 10 mm.

According to another aspect, the filter may be electrostatically charged and configured to kill bacteria or viruses.

According to another aspect, the filter may be heated and configured to kill bacteria and viruses.

According to another aspect, the filter may be heated or electrostatically charged and configured to kill SARS-COV-2.

According to another aspect, the register may be configured such that, during normal operation, air speed measured at the airflow outlet is at least 90% of the air speed measured at the airflow outlet of a substantially identical register that does not include a filter.

According to another aspect, the register may be made of metal.

According to another aspect, the register may include a battery pack. The battery pack may be configured to electrostatically charge or heat the filter or a filter element.

According to one aspect, a ventilation register may include a panel including a flange configured to engage a floor surface, the panel having first apertures. The ventilation register includes a filter having second apertures. The filter is coupled to the panel and configured to trap objects and entities that enter the ventilation register. The second apertures are smaller than the first apertures. The filter is positionable in at least a first position and a second position. When the filter is positioned in the first position, objects and entities are inhibited from passing through the ventilation register. When the filter is positioned in the second position, objects and entities trapped by the filter may be removed from the ventilation register.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1:
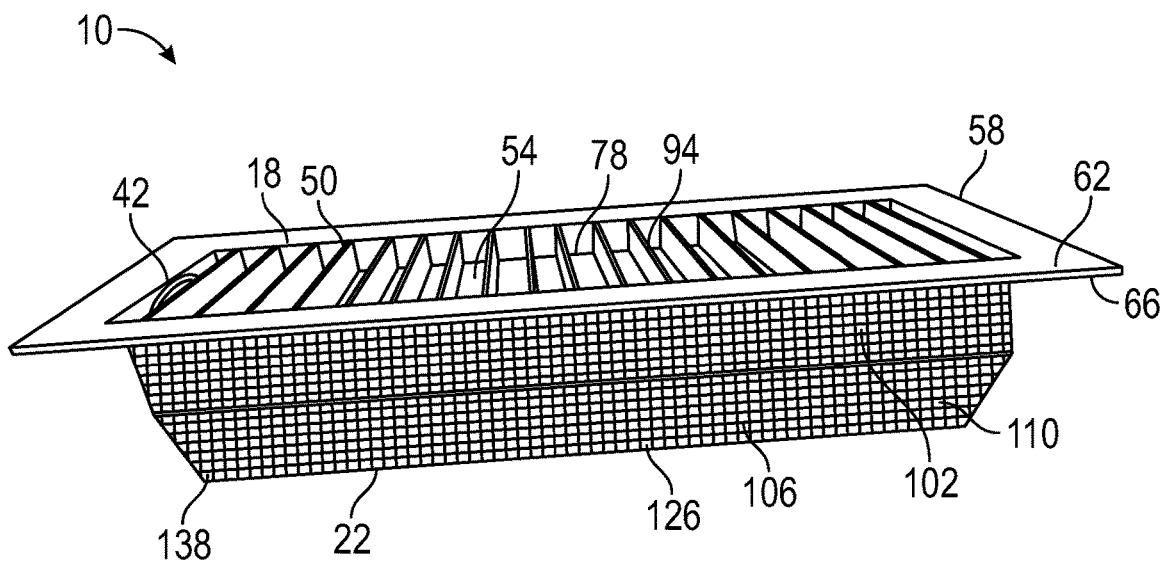
FIG. 1 is a perspective view of a vent register according to one embodiment.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

In this disclosure, ventilation registers are provided which include filters to prevent the passage of objects or entities through the filters. In one example, FIGS. 1-4 illustrate perspective, top, cross-section, and side views of an embodiment of a ventilation register 10 in accordance with various aspects as described herein. The register 10 includes an airflow control structure 14, a panel 18, a filter 22, and a housing 26 disposed between the panel 18 and the filter 22. In the illustrated embodiment, the airflow control structure 14 is a louver structure 30. In other embodiments, the airflow control structure 14 may comprise a longitudinally or transversally slidable cover that is configured to increase a resistance to airflow of the vent register 10 and thereby reduce a flow of air through the vent register 10. An airflow direction is shown by the arrow in FIG. 4.

Figure 2:
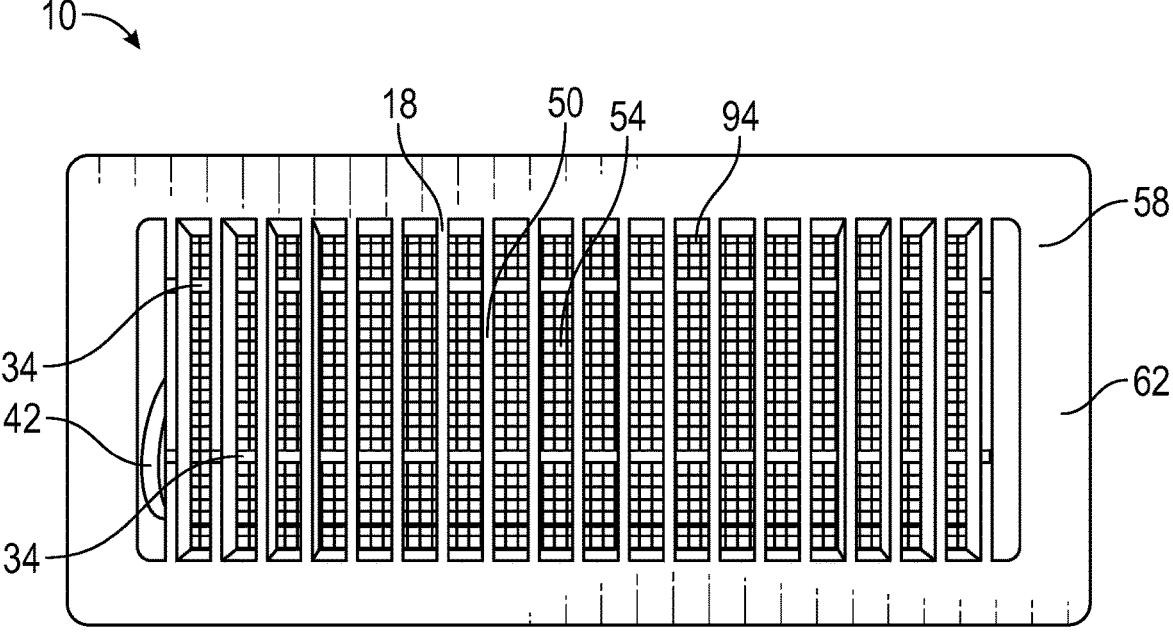
FIG. 2 is a top view of the vent register of FIG. 1.
Figure 3:
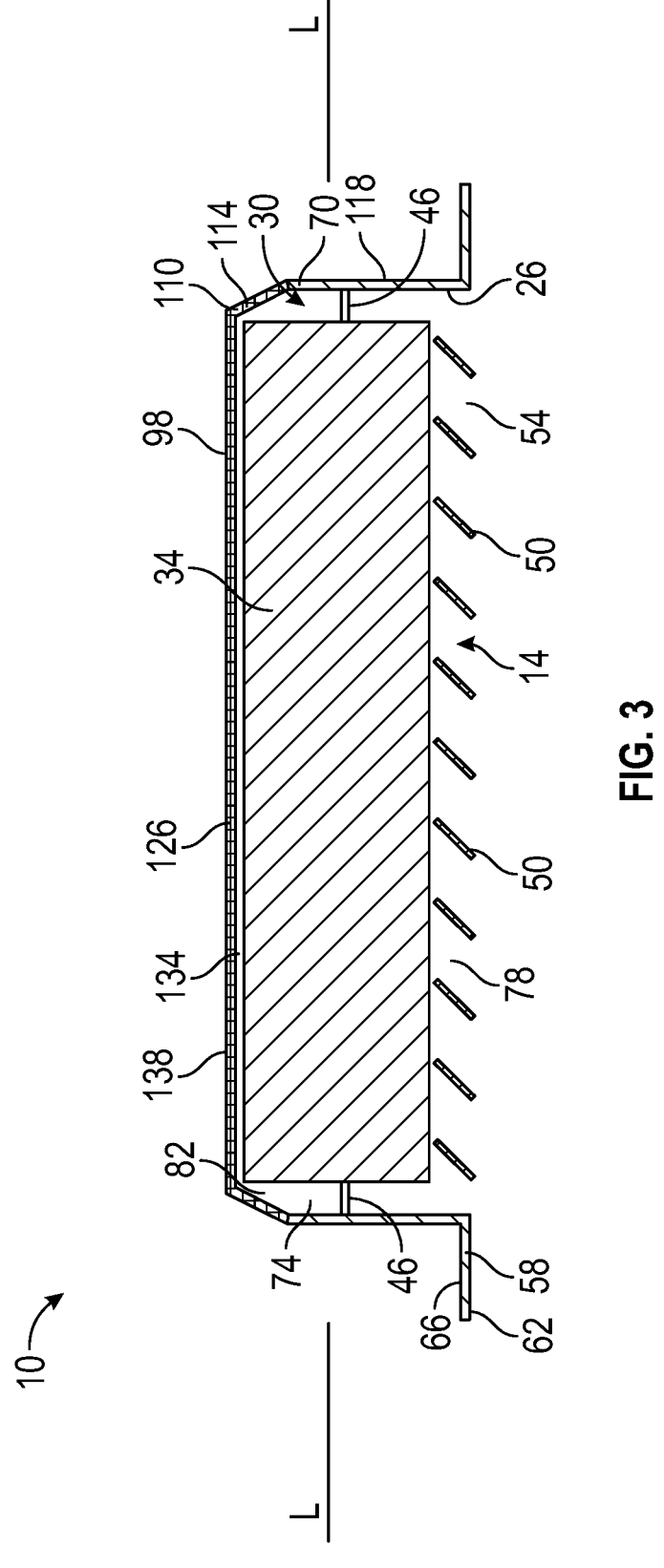
FIG. 3 is an upside-down cross section view of the vent register of FIG. 1.
Figure 4:
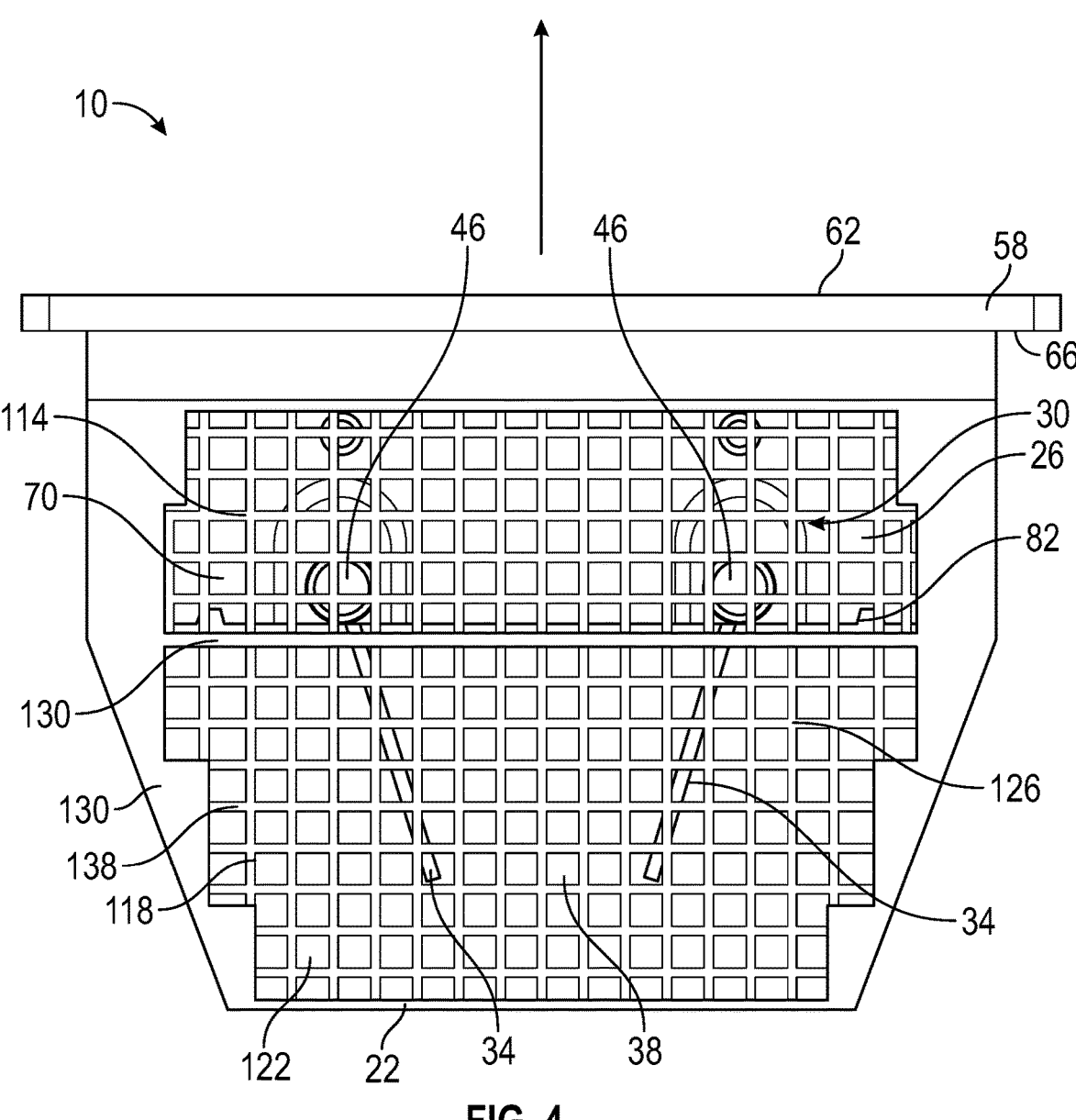
FIG. 4 is a front view of the vent register of FIG. 1.
Figure 5:
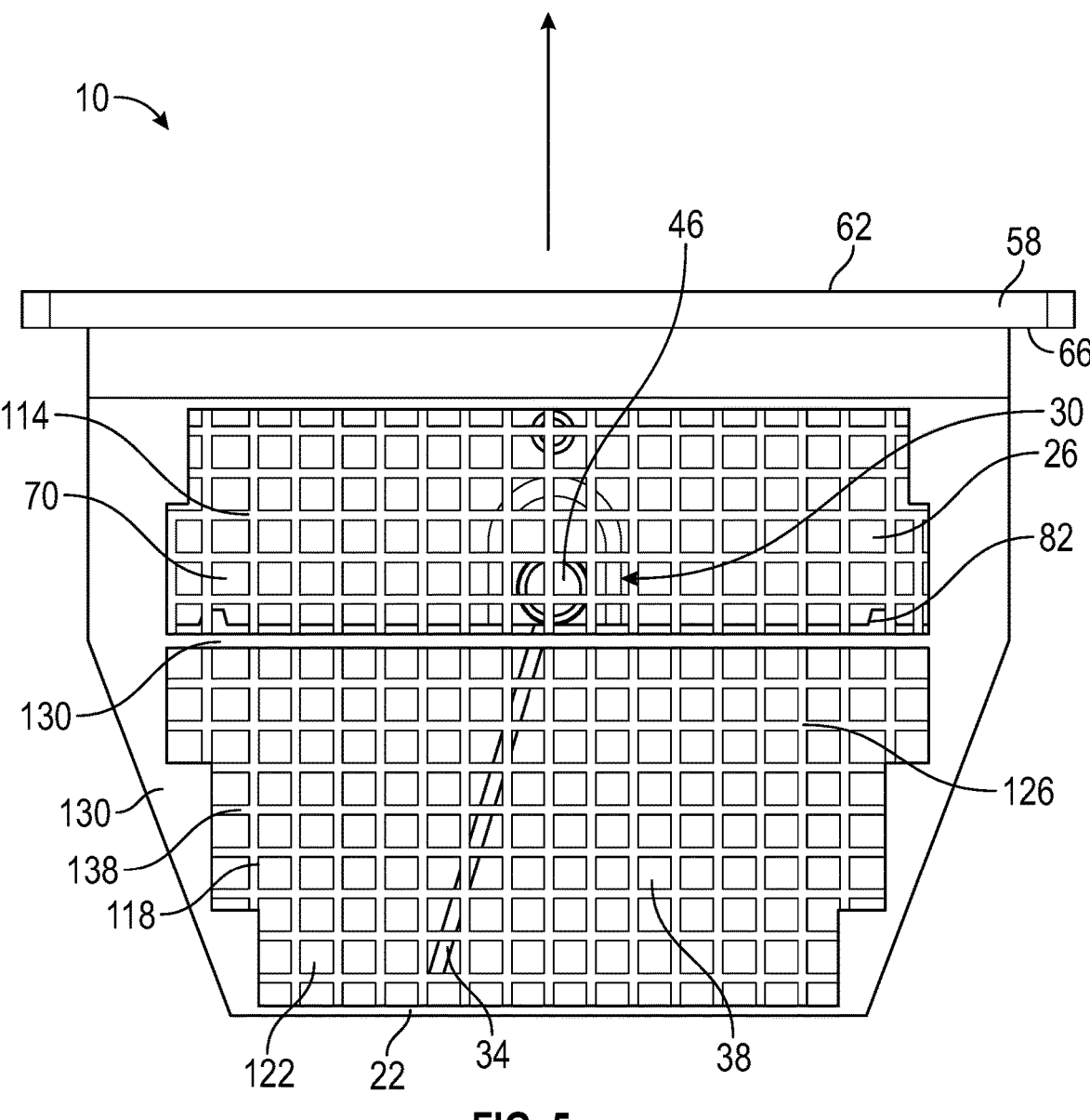
FIG. 5 is a front view of a variation of the vent register of FIG. 1, the vent register having one slat instead of two slats.

With reference to FIGS. 1-5, the louver structure 30 includes one or more longitudinal rotatable slats 34 or dampers 34 that are operable to adjust variable apertures 38, which also may be known as adjustable apertures 38, between a fully open and a fully closed position. The rotatable slats 34 may at least partially define the adjustable apertures 38. FIGS. 2-4 show the louver structure 30 with two slats 34 and with the slats 34 in a fully opened position. FIG. 5 shows a variation of the vent register 10 of FIG. 1 with the vent register 10 having one slat 34. An ordinarily skilled artisan will recognize that the slats 34 of a louver structure 30 may be in various positions between fully opened and fully closed. As shown in FIGS. 1 and 2, the slats 34 may be adjusted by means of an actuator 42 in the form of a dial, slide, or other appropriate device that allows a user to rotate the slats 34 partially or fully and thereby adjust the size of the apertures. The slats 34 are supported by rotatable hinge pins 46 that are coupled to the slats 34.

As shown in FIGS. 4 and 5, a housing 26 extends downwardly from the panel 18. The housing 26 is operable to couple the panel 18 to the louver structure 30. As shown in FIGS. 1 and 2, the panel 18 includes vanes 50 which form a plurality of first apertures 54 disposed between the vanes 50. The first apertures 54 are configured to allow airflow through the panel 18. In the illustrated embodiment, the positions of the vanes 50 are not adjustable. In other embodiments, the positions of the vanes 50 may be adjustable in a way similar to the way in which the slats 34 in the louver structure 30 are adjustable or in a different manner. For example, the airflow may be controllable by means of a longitudinal or transversal slide that controls the size of the first apertures 54 between a fully open position and a fully closed position. The longitudinal or transversal slide that limits the size of the first apertures 54 may be a slidable cover. In embodiments in which the vanes 50 are adjustable to vary the sizes of the first apertures 54, the vent register 10 may not include a louver structure 30 or slats 34. However, in some embodiments, the airflow may not be controllable at all. In those embodiments, the vent register 10 may not include adjustable vanes 50 or a louver structure 30.

Returning to FIGS. 1 and 2 of the illustrated embodiment, the vanes 50 are oriented transversely to the slats 34 of the louver structure 30. In other embodiments, the vanes 50 may be oriented in the same longitudinal direction as the slats 34 or in a different direction. Further, in some embodiments, the vanes 50 may be oriented at an angle to the orientation of the slats 34. The vanes 50 may even be in shapes such that the first apertures 54 are in the form of a design (for example, the first apertures 54 might be in the shape of the Christian cross, hearts, leaves, feathers, or other designs). The term "vane" should not be understood to mean only straight fins, but rather should be taken to mean any structure within the panel 18 that breaks the panel 18 into first apertures 54. In a preferred embodiment, the vanes 50 are spaced apart in order to provide first apertures 54 large enough to allow substantial airflow with little air resistance. Because the first apertures 54 are relatively large, they are large enough for an object (e.g., coin, jewelry, toy, food, or the like) or an entity (e.g., insect, rodent, snake, or the like of a certain size) to pass through.

The panel 18 further includes a floor-contact flange 58. The floor-contact flange 58 extends peripherally around the panel 18 (and therefore, about a periphery of the side walls 70) and includes a top surface 62 and a bottom surface 66. The bottom surface 66 of the floor-contact flange 58 contacts a floor when the register 10 is installed in a register boot. Vent registers may also be installed in walls, ceilings, or in other locations. The term "floor-contact flange" is intended merely to be descriptive of a support flange around the panel 18 and not limiting to only vent registers that are installed in a floor.

Figure 6:
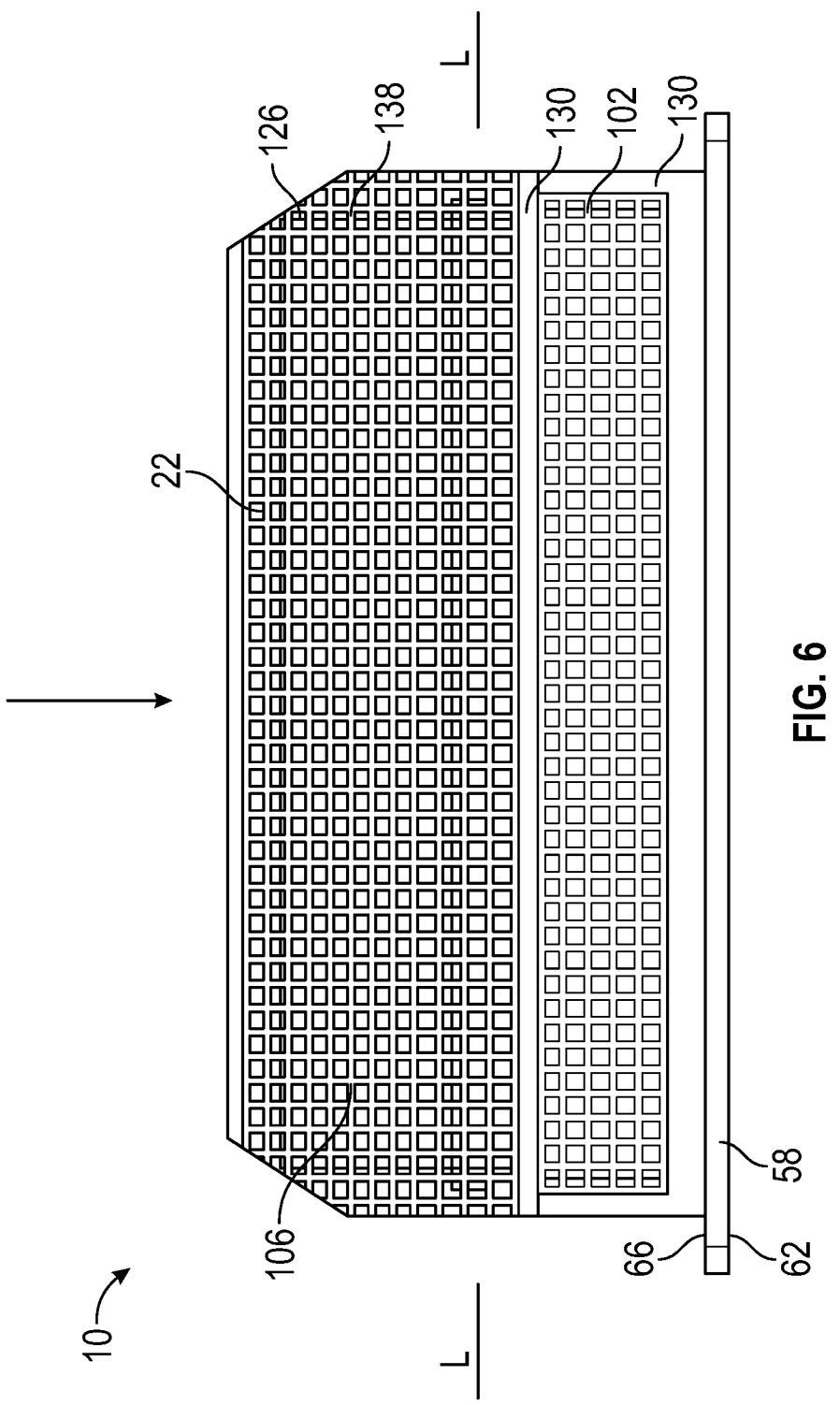
FIG. 6 is an upside-down side view of the vent register of FIG. 1.

With reference to FIGS. 3-6, the housing 26 is coupled to the bottom surface 66 of the floor-contact flange 58 of the panel 18. An airflow direction is shown in FIGS. 4-6 by arrows. The housing 26 includes side walls 70 that extend away from the panel 18. The side walls 70 include an inside and an outside. The side walls 70 from a hollow enclosure 74 with a front opening 78 and a back opening 82. The floor-contact flange 58 defines at least a portion of the front opening 78. The front and back openings 78, 82 form an airflow pathway configured to allow airflow through the register 10 and through the first apertures 54. The airflow pathway includes an airflow inlet 90 and an airflow outlet 94. The airflow control structure 14, which may be a louver structure 30, is disposed within the hollow enclosure 74. Further, the louver structure 30 may have a size and a shape that corresponds to a size and a shape of the hollow enclosure 74. In some embodiments, a portion of the slats 34 may protrude out of the back opening 82 when the slats 34 are in the fully open position.

As shown in FIGS. 1 and 4-7A, a filter 22 is disposed on an opposite side of the housing 26 from the panel 18. The filter 22 may include a back panel 98, side panels (including both upper side panels 102 and lower side panels 106), angled panels 110, and end panels (including both upper end panels 114 and lower end panels 118), each of which may be of similar or different construction to each other. The filter 22 includes a plurality of second apertures 122 adapted to allow airflow through the filter 22 while inhibiting the movement of an object or entity through the filter 22. The second apertures 122 are smaller than the first apertures 54. The filter 22 is at least partially made of a partially closed material that allows airflow such as a mesh 126. The mesh 126 is configured to prevent objects and entities from passing through the mesh 126 but to allow airflow to pass through the mesh 126. Structure is provided to the mesh 126 by an arrangement of support bars 130. The support bars 130 are welded or otherwise fixed together to provide substantially permanent structure to the filter 22. The second apertures 122 have a diameter (if circular) or a width (if noncircular).

In some embodiments, the filter 22 is fixed on the outside of the side walls 70 of the housing 26. In such embodiments, the filter 22 may be mounted directly to the housing 26 by welding or by other means. The filter 22 may also be mounted to the panel 18 or to the floor-contact flange 58 in such a manner that the filter 22 substantially encloses the housing 26. In other words, the filter 22 may include an interior side 134 and an exterior side 138, and the housing 26 may be disposed on the interior side 134 of the filter 22. In other embodiments, which are to be described in more detail later, the filter 22 may be integrated into the side walls 70 such that the side walls 70 transition from a solid material into a material such as a mesh 126 that includes the second apertures 122.

The diameter or width of each second aperture may preferably be in a range from 0.5 millimeters to six (6) millimeters. The second apertures 122 can be in standard mesh sizes, for example US 3.5 (5.60 mm), 5 (5.60 mm), 4 (4.75 mm), 5 (4.60 mm), 6 (3.35 mm), 7 (2.80 mm), 8 (2.36 mm), 10 (2.00 mm), 12 (1.70 mm), 14 (1.40 mm), 16 (1.18 mm), 18 (1.00 mm), 20 (0.85 mm), 25 (0.71 mm), 30 (0.60 mm), 35 (0.50 mm). Also, larger second aperture diameters can be used up to about 10 mm. The second apertures 122 may have a diameter or width that is less than one one-hundredth of the diameter or width of the first apertures 54. In some embodiments, the second apertures 122 may have a diameter or width that is less than one two-hundredth of the diameter or width of the first apertures 54. Further, the filter 22 may be composed of metal (including steel, copper, brass, iron, and the like), plastic, rubber, composite material, or any other type of appropriate material. The filter 22 may be made of composite materials, and it may be made of a combination of different materials. The filter 22 may be fixedly attached to the housing 26 by fasteners (including screws, nails, glues, or the like), by welds, by brazing, by integration into the side walls 70 of the housing 26, or by a combination of methods. In some embodiments, the filter 22 may be extruded from the housing 26 such that the housing 26 and the filter 22 are made as a single component. In yet other embodiments, the filter 22 may be extruded from the housing 26 and the housing 26 extruded from the flange such that the entire body of the register 10 (except for the louver structure 30 and actuator 42) is made as a single component.

Each second aperture 122 may be any shape including a rectangle, square, polygon such as a star-shaped polygon, circle, oval, or the like. One type of rectangular mesh 126 is shown, for example, in FIG. 4. In some embodiments, the second apertures 122 may not all be uniform sizes and shapes, but rather may differ in size and shape across the filter 22.

As shown in FIGS. 1 and 2, and as previously discussed, the slats 34 included in the louver structure 30 may be adjusted by means of an actuator 42 between a fully open position in which the slats 34 are substantially parallel with an airflow direction and a fully closed position in which the slats 34 are substantially perpendicular with the airflow direction. Variable apertures 38, which may also be referred to as third apertures 38, are defined on either side of the slats 34, and the size of the third apertures 38 is adjustable based on the position of the slats 34.

Each of the first, second, and third apertures has a cross-sectional area defined perpendicularly (normal) to the airflow direction. An average cross-sectional area can be calculated for each aperture by summing the total cross-sectional area for type of aperture (for example, by adding up the total cross-sectional area for each of the first apertures 54) and dividing it by the number of apertures (for example, by dividing the sum of the cross-sectional area for all of the first apertures 54 by the number of first apertures 54). The average of the cross-sectional areas of the first apertures 54 is the first average cross-sectional area. The average of the cross-sectional areas of the second apertures 122 is the second average cross-sectional area. The average of the cross-sectional areas of the third apertures is the third average cross-sectional area. The third average cross-sectional area varies depending on the degree to which the airflow control structure 14, which in the illustrated embodiment is a louver structure 30, is opened. When the airflow control structure 14 is maximally opened, the third average cross-sectional area is at a maximum. The second average cross-sectional area is smaller than the first average cross-sectional area. Further, the second average cross-sectional area is smaller than the third average cross-sectional area. The second average cross-sectional area is the smallest because it is adapted to prevent the passage of objects or entities through the second apertures 122 even though those objects or entities might be able to pass through the first apertures 54 and the third apertures. The second apertures 122 may have a second cross-sectional area that is less than one one-hundredth of the first cross-sectional area. In other embodiments, the second apertures 122 may have a second cross-sectional area that is less than one two-hundredth of the first cross-sectional area.

As shown in FIGS. 4 and 6, the filter 22 may include end panels (including both upper and lower end panels 114, 118) and side panels 102, 106 that may also have a plurality of second apertures 122 that allow air to flow through that end panel 114, 118 or side panel 102, 106 while inhibiting a movement of an object or an entity through that end panel 114, 118 or side panel 102, 106. One or more of the end panels 114, 118 or side panels 102, 106 may be composed of a mesh 126 material. Also, or alternatively, each of the end panels 114, 118 or side panels 102, 106 may be composed of metal, plastic, rubber, composite material, or the like. The side walls 70 of the housing 26 are disposed within the upper end panels 114 and the upper side panels 102 such that air can flow through the end panels 114, 118 and side panels 102, 106, toward the back opening 82, through the variable apertures 38 between the slats 34 of the louver structure 30, and through the airflow pathway to the first apertures 54. Each side wall 70 of the housing 26 may be parallel to an associated upper end panel 114 or upper side panel 102 of the filter 22.

The back panel 98, side panels 102, 106, end panels 114, 118, angled panels 110, or any other panels of the filter 22 can be formed from a metal mesh 126 that is welded, woven, or formed in another manner. The metal mesh 126 can be aluminum wire mesh, copper wire mesh, brass wire mesh, bronze wire mesh, mild steel wire mesh, pre-galvanized wire mesh, stainless steel wire mesh, or another type of mesh 126. The mesh 126 can also be coated with PVC (polyvinyl chloride). The mesh 126 can also be formed from plastic materials such as HDPE (high density polyethylene) or PP (polypropylene). Plastic materials may include plastic mesh such as extruded plastic mesh, knotted plastic mesh or knitted plastic mesh. The plastic can be UV stabilized with, for example, benzophenones or a benzotriazole compound.

The depth of the filter 22 may be at least a depth of the louver structure 30 with the slats 34 fully opened so that the louver structure 30 may be disposed within the filter 22 and operable to position the slats 34 between fully open and fully closed. In other words, if the housing 26 and the louver structure 30 are both disposed within the filter 22, then the filter 22 may be so dimensioned so as to allow the slats 34 of the louver structure 30 to be fully opened. The filter 22 may also correspond to the dimensions of a register boot (not shown). For example, if the opening of the boot has a dimension of 10"×4"×6" (length:width:depth), the filter 22 may approximate but may not be larger than these dimensions so as to fit snugly inside the boot.

The basket-like geometry of the filter 22 creates a space inside which a filter element (not shown) can be placed. For example, the filter element may be placed between the panel 18 and the filter 22 in a manner that does not interfere with the operation of the louver structure 30. The filter element can be shaped to conform with the filter 22 and to force substantially all of the air passing through the vent register 10 to pass through the filter element. The filter element can be formed from fibrous or porous material such as paper, cloth, fiberglass, foam, cotton or a non-woven material such as REMAY (spunbond polyester). The filter element can be treated with an antimicrobial agent or activated carbon to remove odors. The antimicrobial agent can be copper and its alloys, a quaternary ammonium compound such as dimethyloctadecyl (3-trimethoxysilyl propyl) ammonium chloride (Si-QAC), tributyl tin, phenyl-diazenyl(phenols), N-halamine materials or an antimicrobial peptide. Antimicrobial treatment can be with nanomaterials such as titanium dioxide, organosilane, silver, zinc oxide, copper, magnetite, magnesium oxide, gold, gallium or carbon nanotubes.

Further, the filter element may be made of metal and heated in order to kill bacteria and viruses such as SARS-COV-2. The filter element might be electrostatically charged in order to kill bacteria and viruses as previously mentioned. The register 10 may include a battery pack (not shown) that is configured to electrostatically charge or heat the filter element.

A sensor (not shown) can also be placed inside the register 10. The sensor can be an infrared sensor, a moisture sensor, a movement sensor, or a camera. The sensor can feed information to a thermostat coupled to an HVAC system or to a computer or smartphone via the IoT (internet of things).

The sensor can thus be used to inform the user if a foreign object is inside the register 10.

As shown in FIGS. 7A, 7B, 8, and 9, a door (FIGS. 7A and 7B), a transverse slide (FIG. 8), a longitudinal slide (FIG. 9), or another access point may be provided in the register 10. Such an access point may be used to retrieve objects or entities that have entered through the first apertures 54 but have been unable to pass through the second apertures 122. The access point could be disposed on the back panel 98, in the side panels 102, 106, or in another suitable location. The access point could be openable by means of a hinge system, a sliding system, a latch, or any number of other systems. Alternatively, the panel 18, including the vanes 50, could be removable from the register 10. In such an embodiment, the register 10 could be removed from the register boot and turned upside down in order to allow objects and entities that have been caught by the filter 22 to fall out of the vent register 10.

Figure 7A:
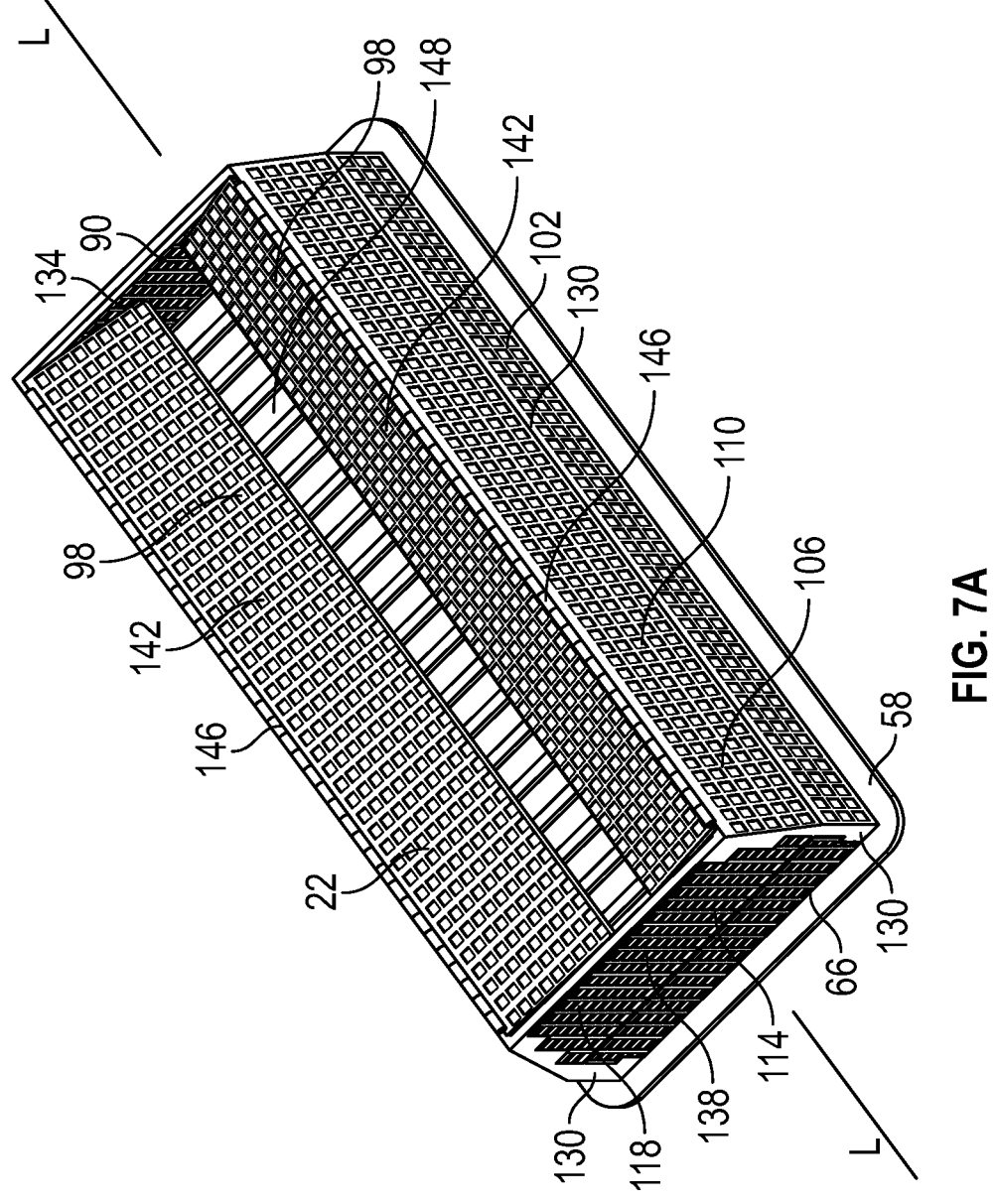
FIG. 7A is an upside-down perspective view of a variation of the vent register of FIG. 1, the vent register including hinged access doors opening inward and having the louvers removed.
Figure 7B:
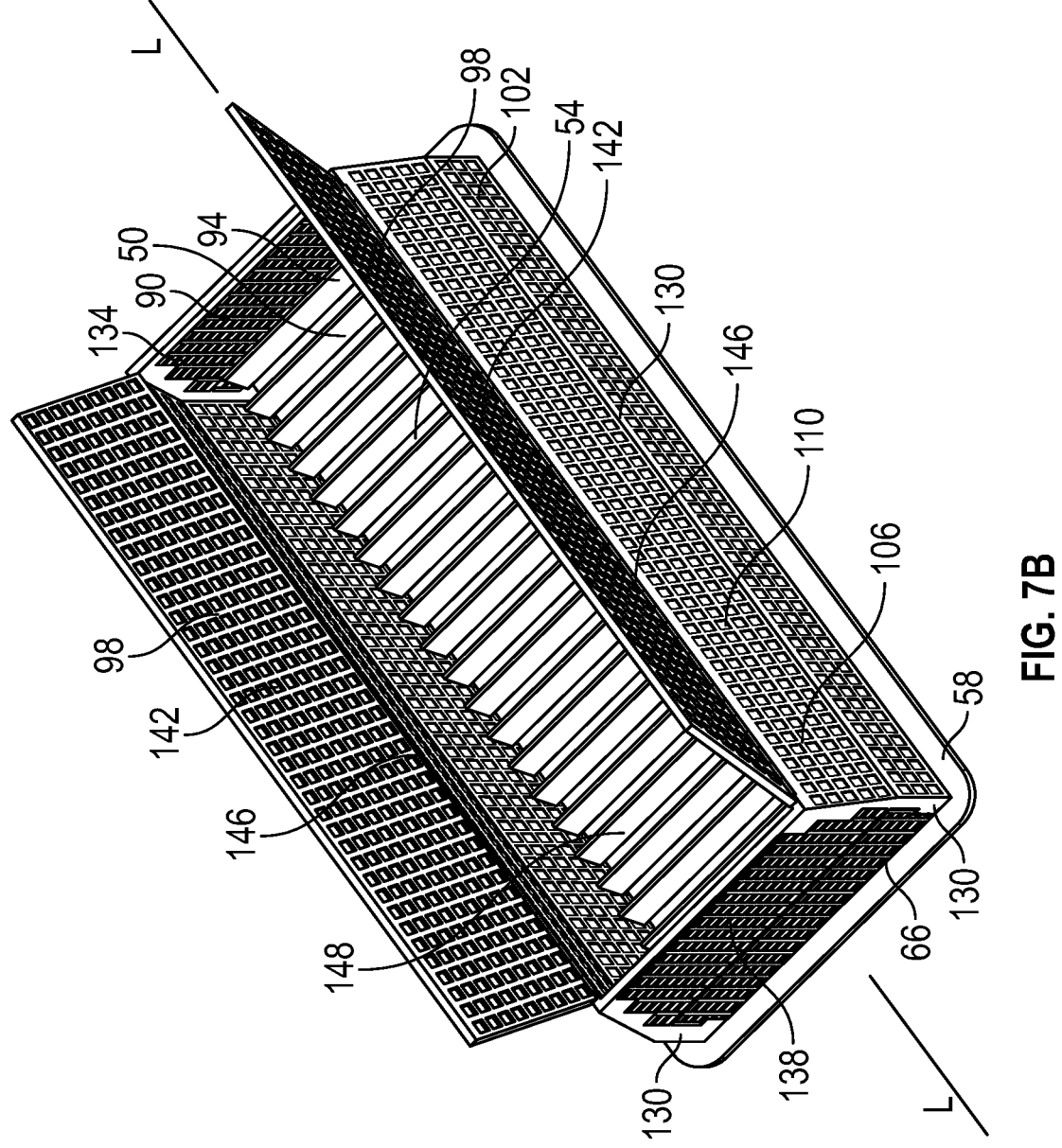
FIG. 7B is an upside-down perspective view of a variation of the vent register of FIG. 1, the vent register including hinged access doors opening outward and having the louvers removed.

FIGS. 7A and 7B show a register 10 including two doors 142, each door having a hinge 146. For clarity, the slats 34 of the louver structure 30 are hidden from the figures. The doors 142 are configured to meet such that, with the doors 142 in the closed position, there is no gap between the doors 142 or between a door and the filter 22 that is greater in size than the size of a second aperture. This prevents objects or entities that could not otherwise pass through the filter 22 from passing through a gap caused by loose-fitting doors 142. A latch could be provided on the bottom of the doors 142 or in any suitable location to keep the doors 142 closed during normal operation and to allow a user to open the doors 142 when desired. The doors 142 may be selectively opened to allow an opening 148 to be formed between the doors 142.

Figure 8:
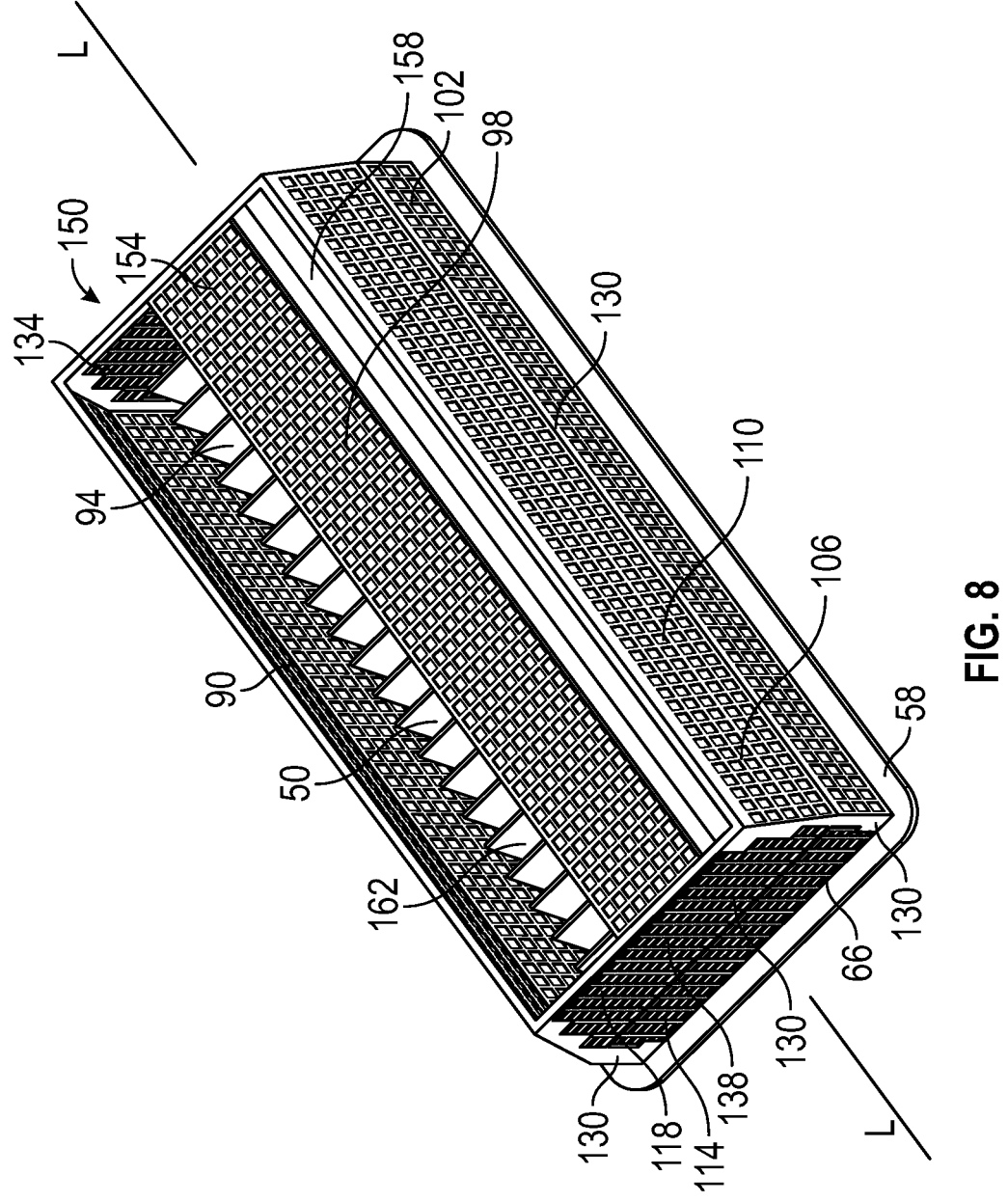
FIG. 8 is an upside-down perspective view of a variation of the vent register of FIG. 1, the vent register including a transversely sliding access door and having the louvers removed.

FIG. 8 shows a register 10 including a transversely sliding access door system 150. For clarity, the slats 34 of the louver structure 30 are hidden from the figure. A first door 154 is disposed underneath a second door 158. A user can slide at least one of the doors 154, 158 in a direction that is perpendicular to a longitudinal axis L of the register 10 in order to create an opening 162. When in the closed position, the transversely sliding access door system 150 inhibits the passage of objects or entities, but when in the open position, the transversely sliding access door system 150 allows a user to retrieve objects or entities from within the filter 22. Further, the door 154, 158 may be of a similar construction, but disposed in the panel 18 rather than in the filter 22.

Figure 9:
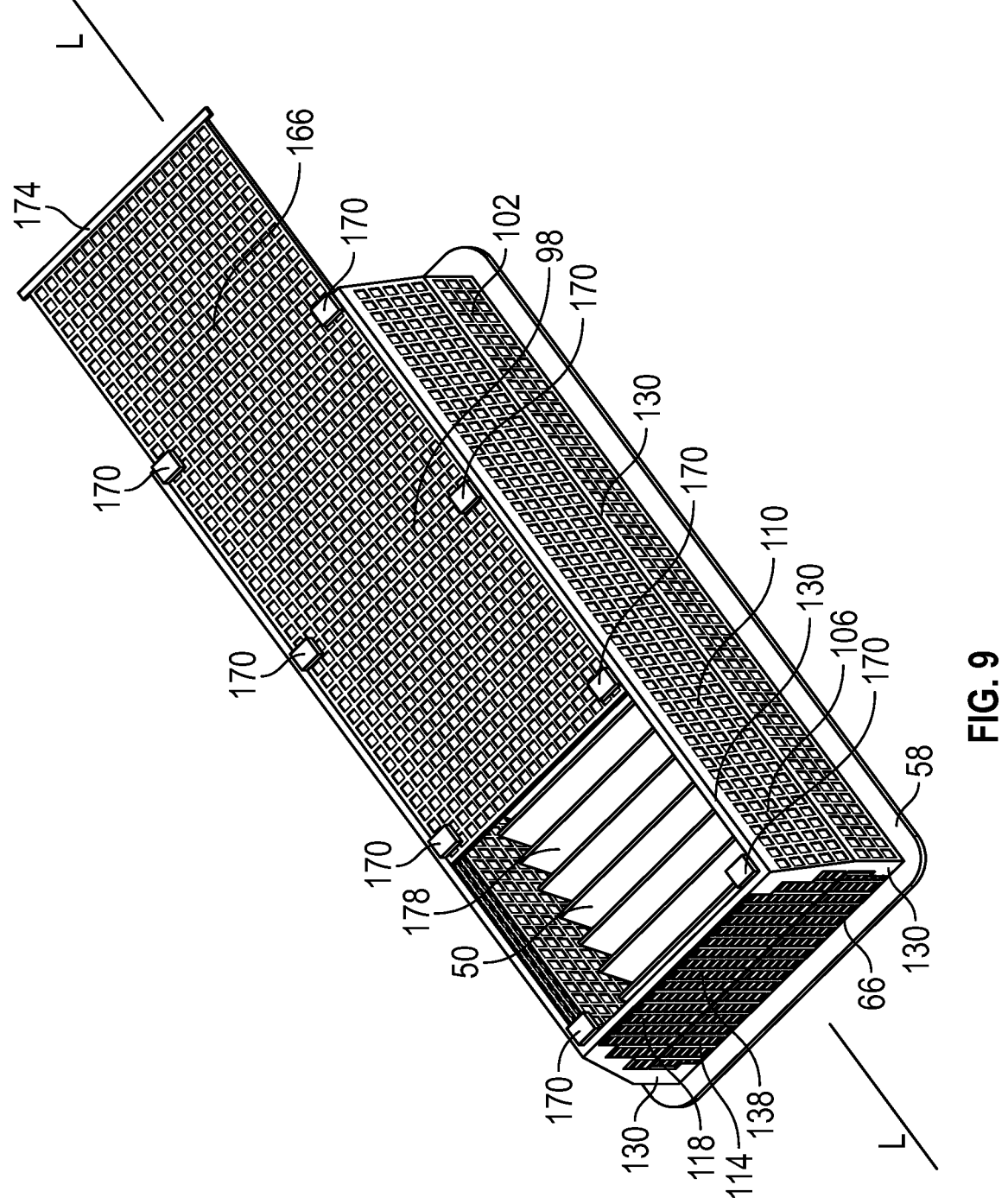
FIG. 9 is an upside-down perspective view of a variation of the vent register of FIG. 1, the vent register including a longitudinally sliding access door and having the louvers removed.

FIG. 9 shows a register 10 including a longitudinally sliding access door 166. For clarity, the slats 34 of the louver structure 30 are hidden from the figure. Support flanges 170 hold the longitudinally sliding access door 166 in place, and a gripping portion 174 allows a user to move the longitudinally sliding access door 166 from a closed position to an open position and vice versa. With the longitudinally sliding access door 166 in the open position, an opening 178 is present in the filter 22 to allow the interior of the vent register 10 to be accessed. With the longitudinally sliding access door 166 in the closed position, the opening 178 is closed by the longitudinally sliding access door 166, thereby preventing an object or entity from passing through the vent register 10. FIG. 9 shows the access door 166 in a partially open configuration such that the opening 178 is present, but is not as large as it would be if the access door 166 were fully open.

Figure 10:
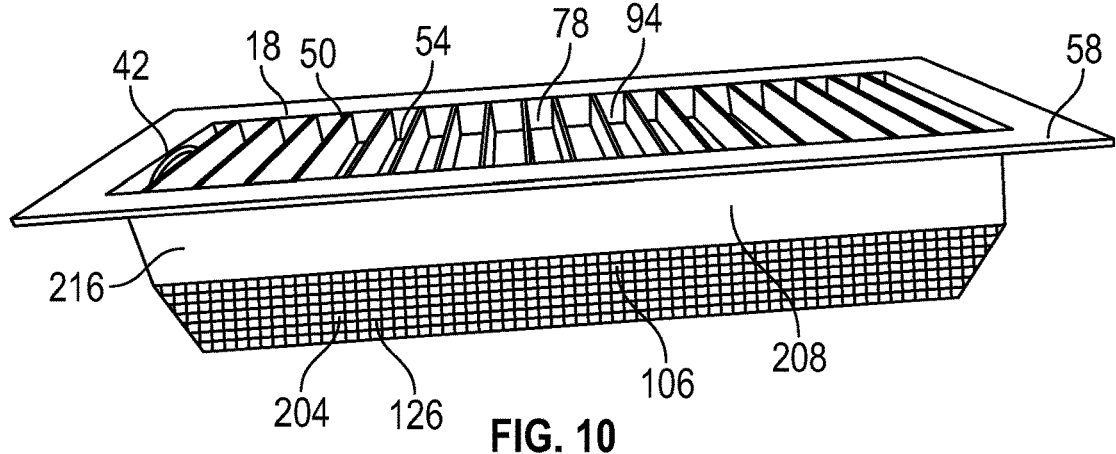
FIG. 10 is a perspective view of a vent register according to another embodiment.
Figure 11:
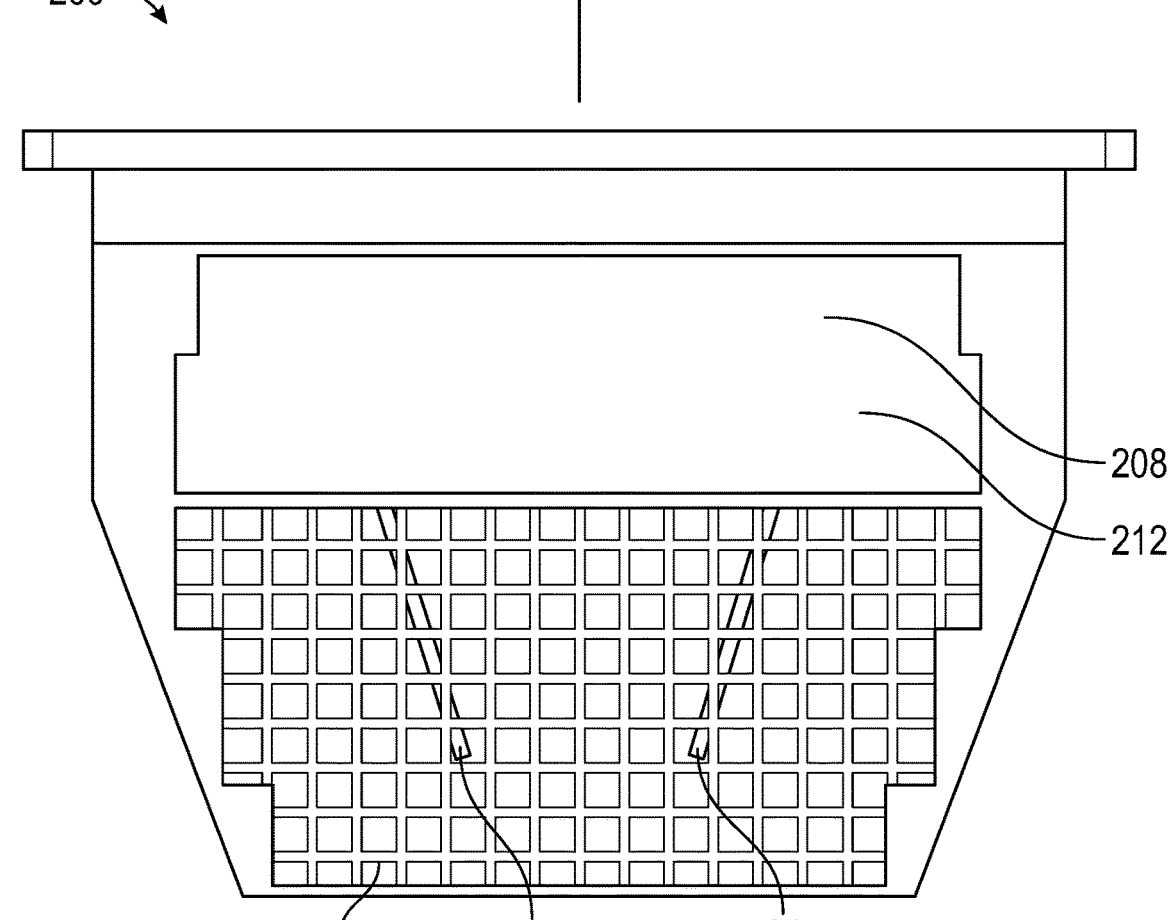
FIG. 11 is a front view of the vent register of FIG. 10.
Figure 12:
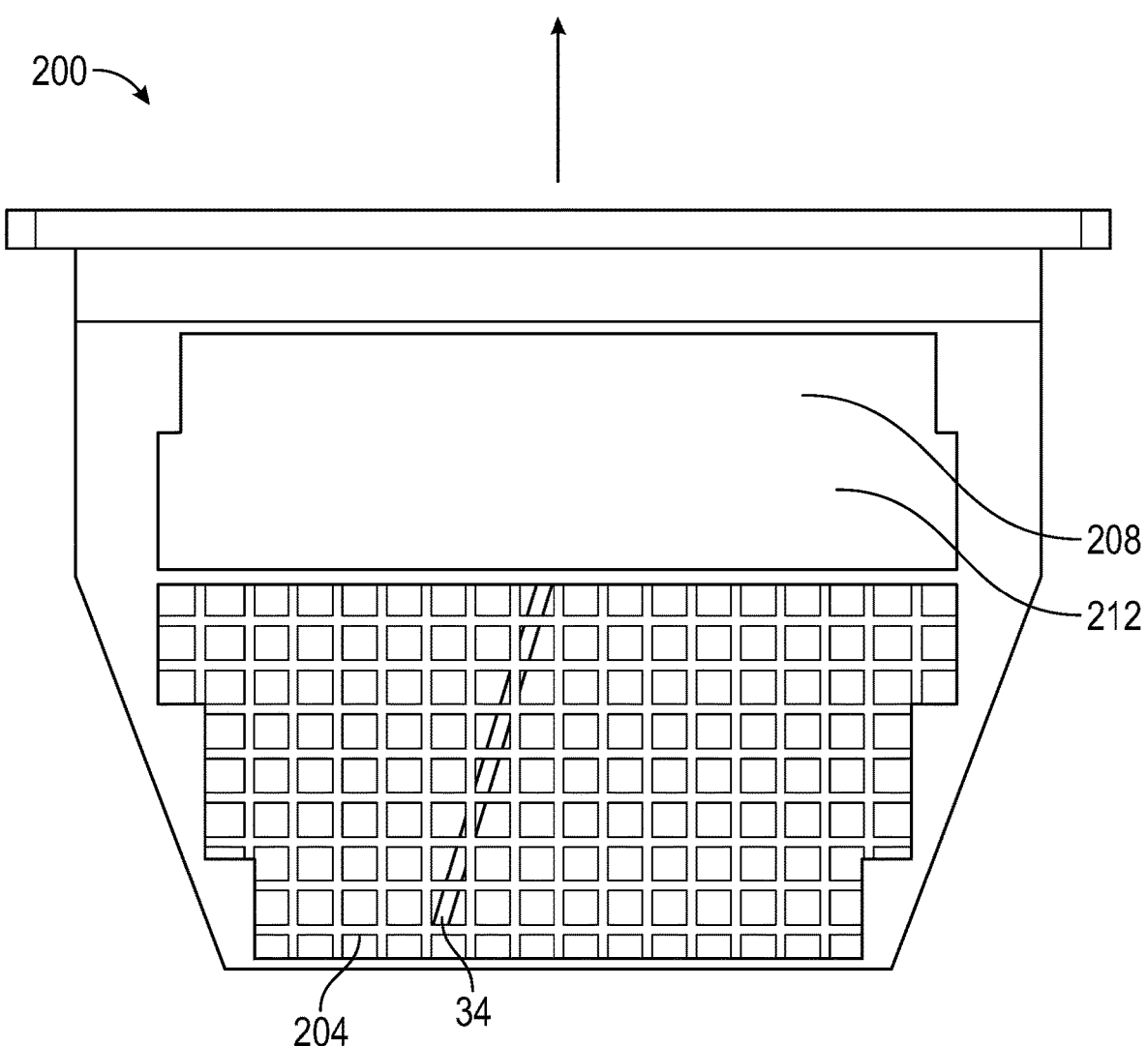
FIG. 12 is a front view of a variation of the vent register of FIG. 10, the vent register having one slat instead of two slats.

As shown in FIGS. 10-12, another embodiment of a vent register 200 is provided. For brevity, only the most significant differences between the embodiment of FIG. 1 and the embodiment of FIG. 10 will be discussed. In contrast to the embodiment of FIG. 1, the embodiment of FIG. 10 includes a housing 26 that is integrated into a filter 204. As a result, the register 200 of FIG. 10 does not include upper end panels 114 and upper side panels 102 that are mesh, but rather includes solid upper end panels 212 and solid upper side panels 216 that also form the housing 208. In other words, in the embodiment of FIG. 10, each side wall 70 of the housing 208 is not parallel to an associated side panel of the filter 204 because the side walls 70 and the solid upper side panels 216 are effectively the same component. In effect, the register 200 and the filter 204 may be made together as a monolithic piece or otherwise coupled together without substantial overlapping. In other words, the back panel 98, end panels 114, 118, and side panels 102, 106 are coupled directly to the side walls 70 of the housing 208. The back panel 98 and the end panels 114, 118 may be coupled to the housing 208 by welding, riveting, brazing, extrusion, or other methods. Further, the embodiment of FIG. 10 may include hinged doors 142, transversely sliding access doors 154, 158, or longitudinally sliding access doors 166, or it may include other methods of access.

Figure 13:
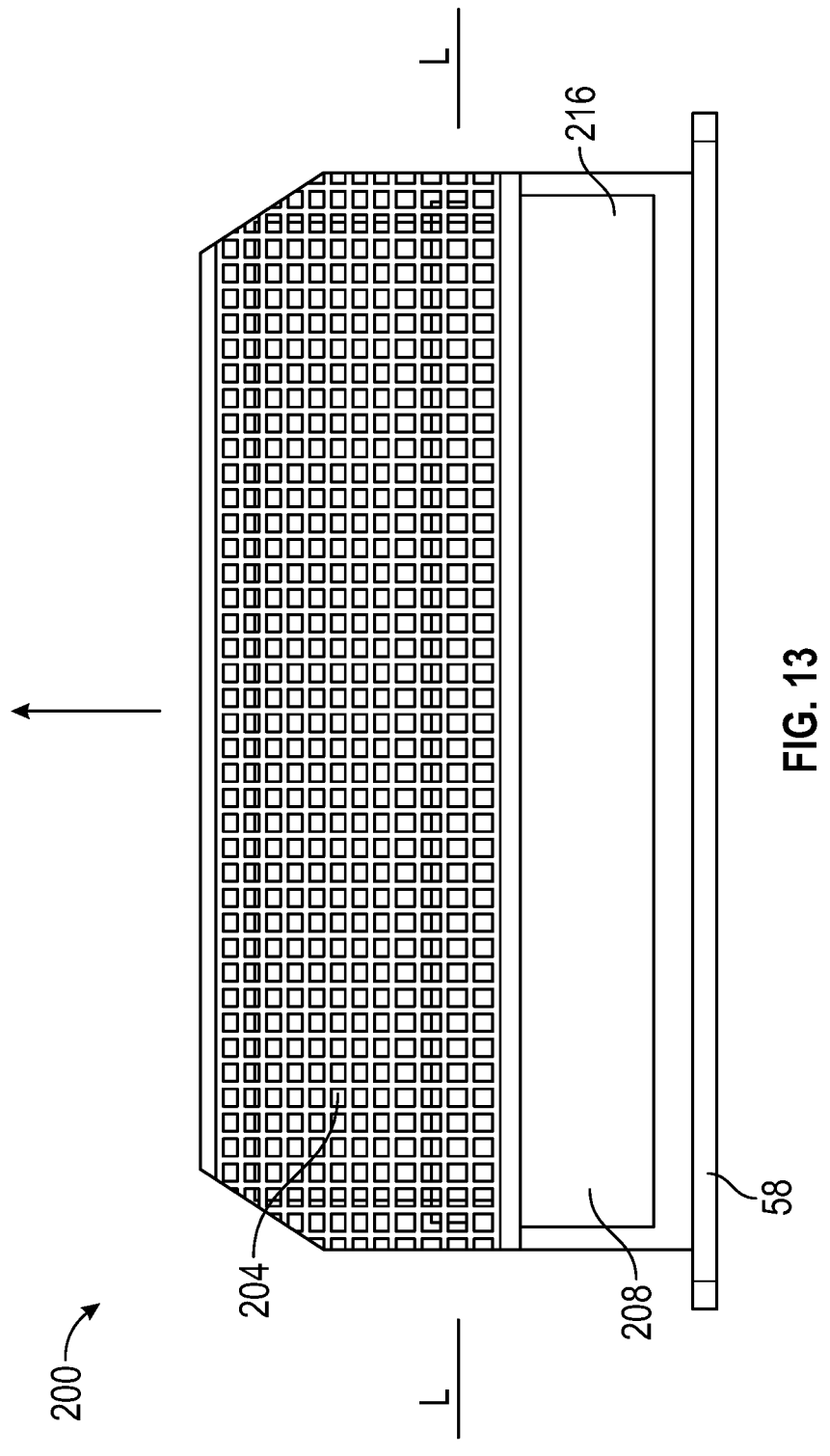
FIG. 13 is an upside-down side view of the vent register of FIG. 10.

FIG. 13 shows a variation of the vent register 200 of FIG. 10 in which the vent register 200 includes one slat 34 instead of two slats 34. Other variations having different numbers of slats 34 or different airflow control structures 14 are possible.

Figure 14A:
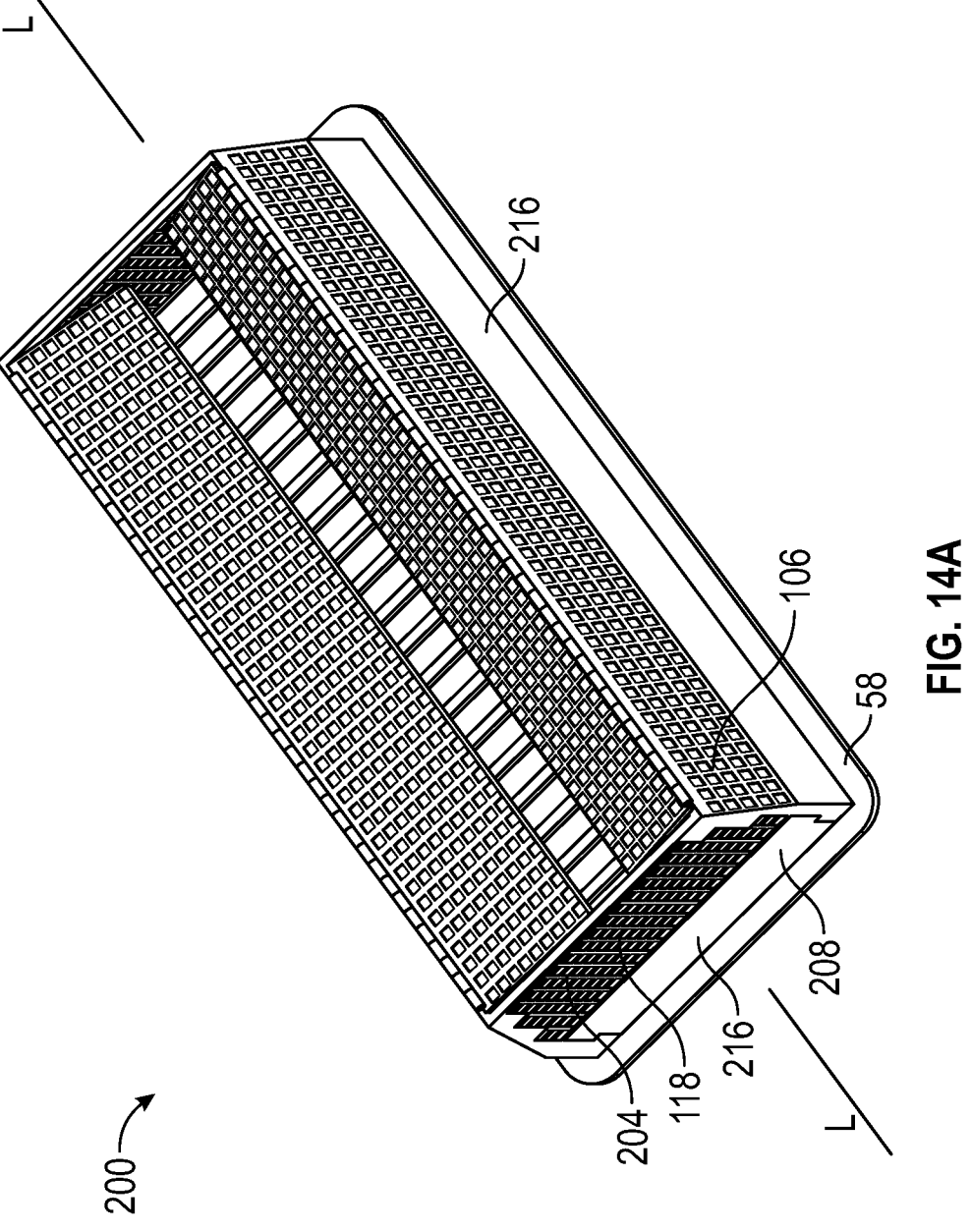
FIG. 14A is an upside-down perspective view of a variation of the vent register of FIG. 10, the vent register including hinged access doors opening inward and having the louvers removed.
Figure 14B:
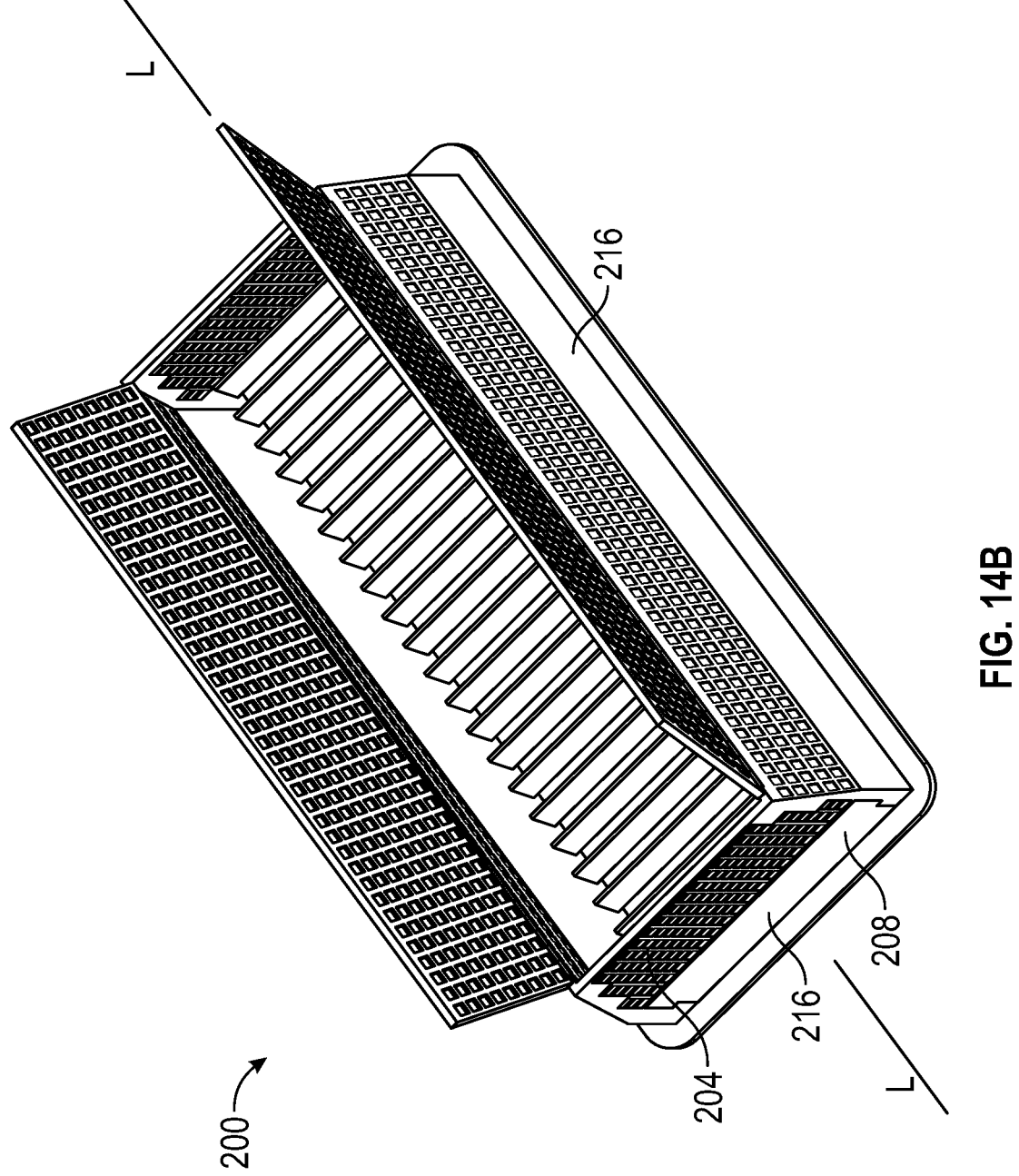
FIG. 14B is an upside-down perspective view of a variation of the vent register of FIG. 10, the vent register including hinged access doors opening outward and having the louvers removed.

FIGS. 14A and 14B show the register 200 of FIG. 10 including two doors 142, each door 142 having a hinge 146. For clarity, the slats 34 of the louver structure 30 are hidden from the figures. The doors 142 are configured to meet such that, with the doors 142 in the closed position, there is no gap between the doors 142 or between a door 142 and the filter 204 that is greater than the size of a second aperture. This prevents objects or entities that could not otherwise pass through the filter 204 from passing through a gap caused by loose-fitting doors 142. A latch could be provided in any suitable location to keep the doors 142 closed during normal operation and to allow a user to open the doors 142 when desired.

Figure 15:
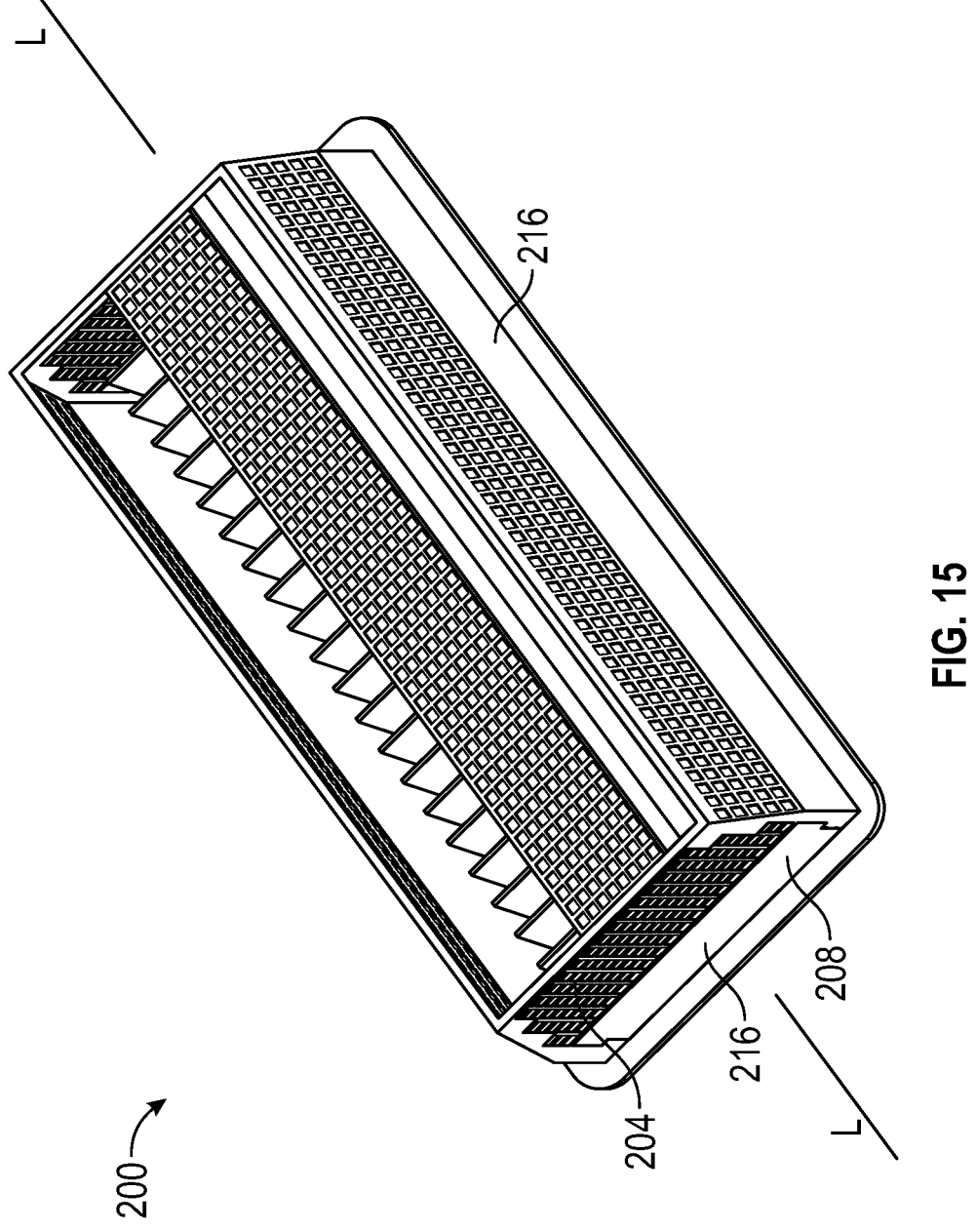
FIG. 15 is an upside-down perspective view of a variation of the vent register of FIG. 10, the vent register including a transversely sliding access door and having the louvers removed.

FIG. 15 shows a register 200 including a transversely sliding access door system 150, which acts as a slide. For clarity, the slats 34 of the louver structure 30 are hidden from the figure. A first door 154 is disposed underneath a second door 158. A user can slide at least one of the doors in a direction that is perpendicular to a longitudinal axis L of the register 200. When in the closed position, the transversely sliding access door system 150 inhibits the passage of objects or entities, but when in the open position, the transversely sliding access door system 150 allows a user to retrieve objects or entities from within the filter 204.

Figure 16:
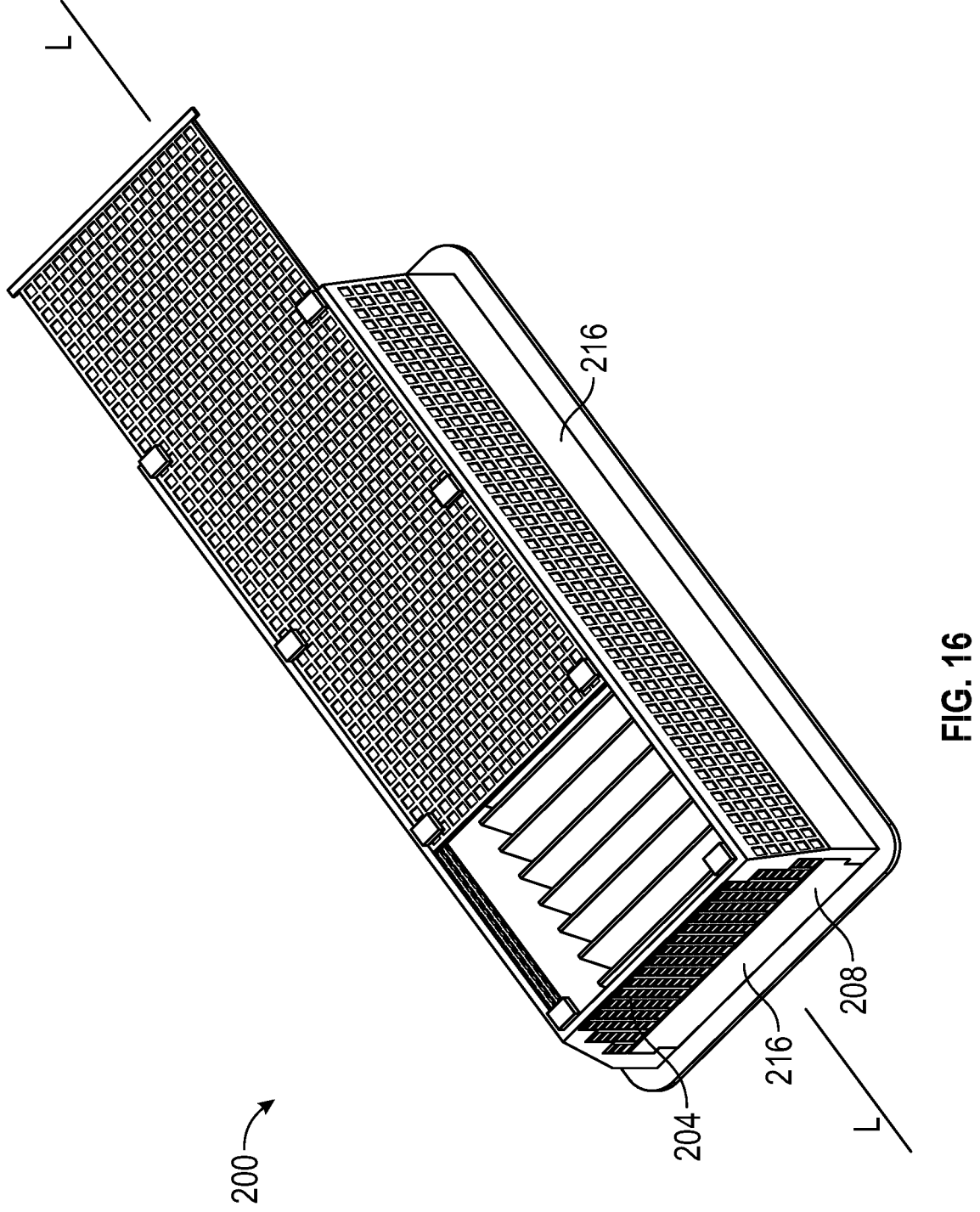
FIG. 16 is an upside-down perspective view of a variation of the vent register of FIG. 10, the vent register including a longitudinally sliding access door and having the louvers removed.

FIG. 16 shows a register 200 including a longitudinally sliding access door 166, which acts as a slide. For clarity, the slats 34 of the louver structure 30 are hidden from FIG. 16. Support flanges 170 hold the longitudinally sliding access door 166 in place, and a gripping portion 174 allows a user to move the longitudinally sliding access door 166 from a closed position to an open position and vice versa. With the access door 166 in the open position, an opening 178 is present in the filter 204 to allow the interior of the vent register 200 to be accessed. With the access door 166 in the closed position, the opening 178 is closed by the access door 166, thereby preventing an object or entity from passing through the vent register 200. FIG. 16 shows the access door 166 in a partially open configuration such that the opening 178 is present, but is not as large as it would be if the access door 166 were fully open.

As shown in FIGS. 17-23, another embodiment of a vent register 300 is provided. For brevity, only the most significant differences between the embodiment of FIG. 1 and the embodiment of FIG. 17 will be discussed. In contrast to the embodiment of FIG. 1, the embodiment of FIG. 17 includes a filter 304 that is positioned between the vanes 50 (and the associated first apertures 54) and the louver structure 30 and within the airflow pathway.

Figure 17:
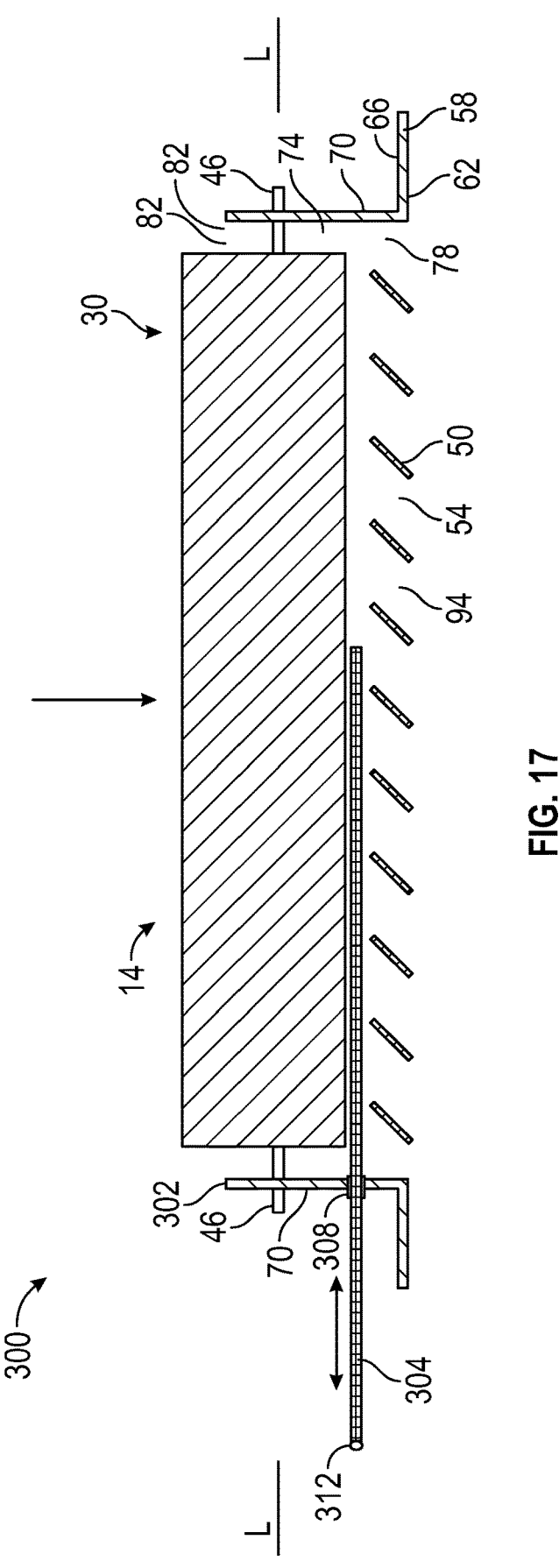
FIG. 17 is a cross section view of a vent register according to another embodiment.
Figure 18:
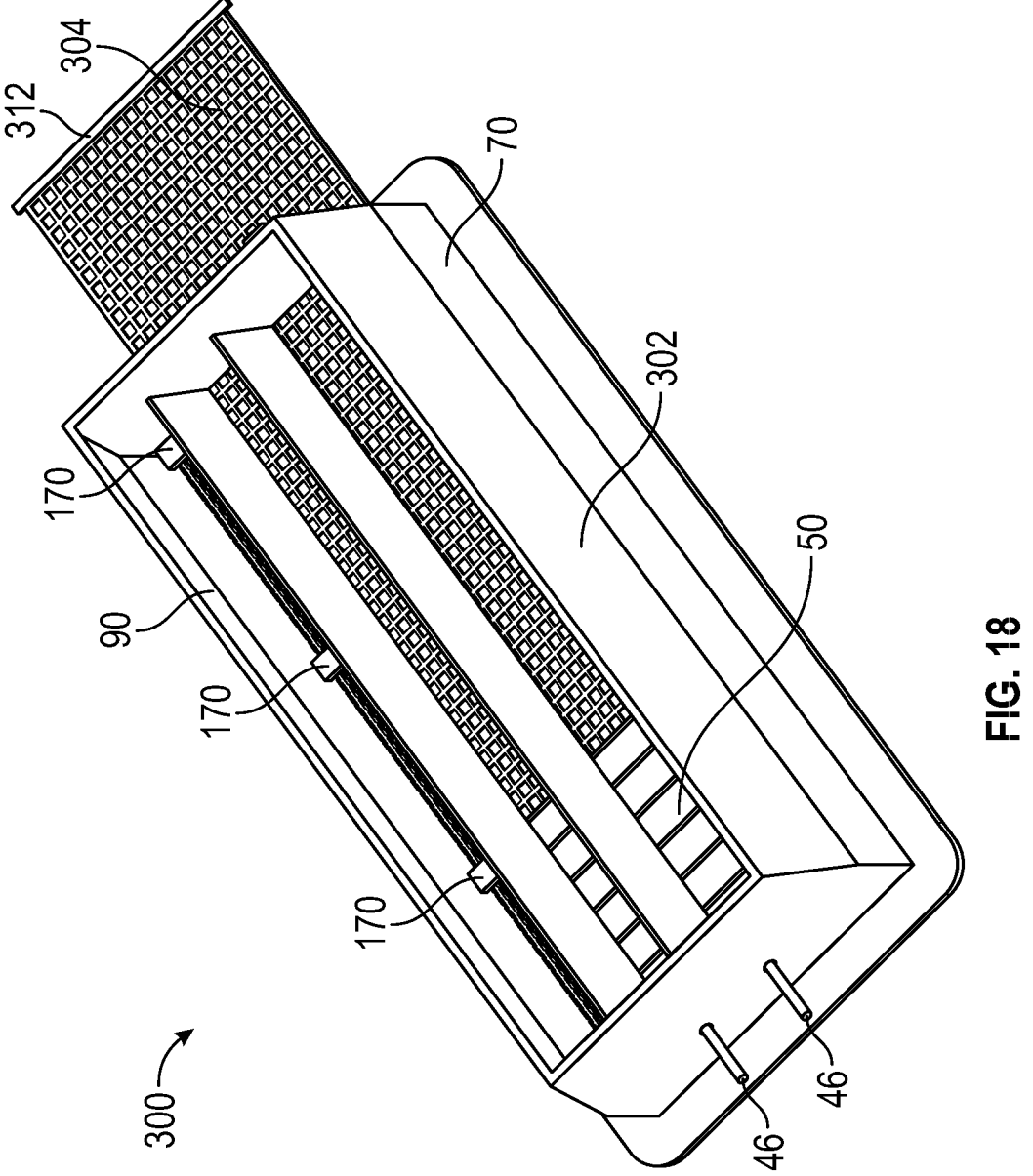
FIG. 18 is an upside-down perspective view of the vent register of FIG. 17.

As shown in FIGS. 17 and 18, a housing 302 of the vent register 300 includes flanges to support the filter 304, and the housing 302 further includes a slot 308. The filter 304 may be inserted into the slot 308 in order to install the filter 304 within the register 300, and the filter 304 may be removed from the slot 308 in order to allow objects or entities that are trapped in the filter 304 to fall around the slats 34 in the louver structure 30 and out the bottom of the register 300. The filter 304 includes a gripping portion 312 that a user can grasp to remove the filter 304 from the housing 302 or to insert the filter 304 into the housing 302.

In some embodiments, the louver structure 30 as previously described may be disposed within the airflow pathway and at least partially within the housing 302. For example, the filter 304 may be provided in the airflow pathway and situated between the panel 18 and the louver structure 30. In such an embodiment, the actuator 42 for adjusting the slats 34 in the louver structure 30 must transmit force through the filter 304 by use of a rotatable shaft, lever, or other force transmission device (not shown). The filter 304 may be fitted around the force transmission device such that a significant gap does not exist around the force transmission device that might allow objects and entities to pass through. As previously described, the vanes 50 in the panel 18 may be adjustable in addition to or in lieu of an adjustable louver structure 30. As a result, another embodiment of a vent register 300 is a vent register 300 having adjustable vanes 50, no louver structure 30, and the slidable insertable filter 304 of the embodiment of FIG. 17. Alternatively, the louver structure 30 may be disposed between the panel 18 and the filter, in which case the filter 304 does not need to be configured to mate tightly against the force transmission device used to adjust the slats 34 in the louver structure 30 because the force transmission device will not be passing beside or through the filter 304.

Figure 19:
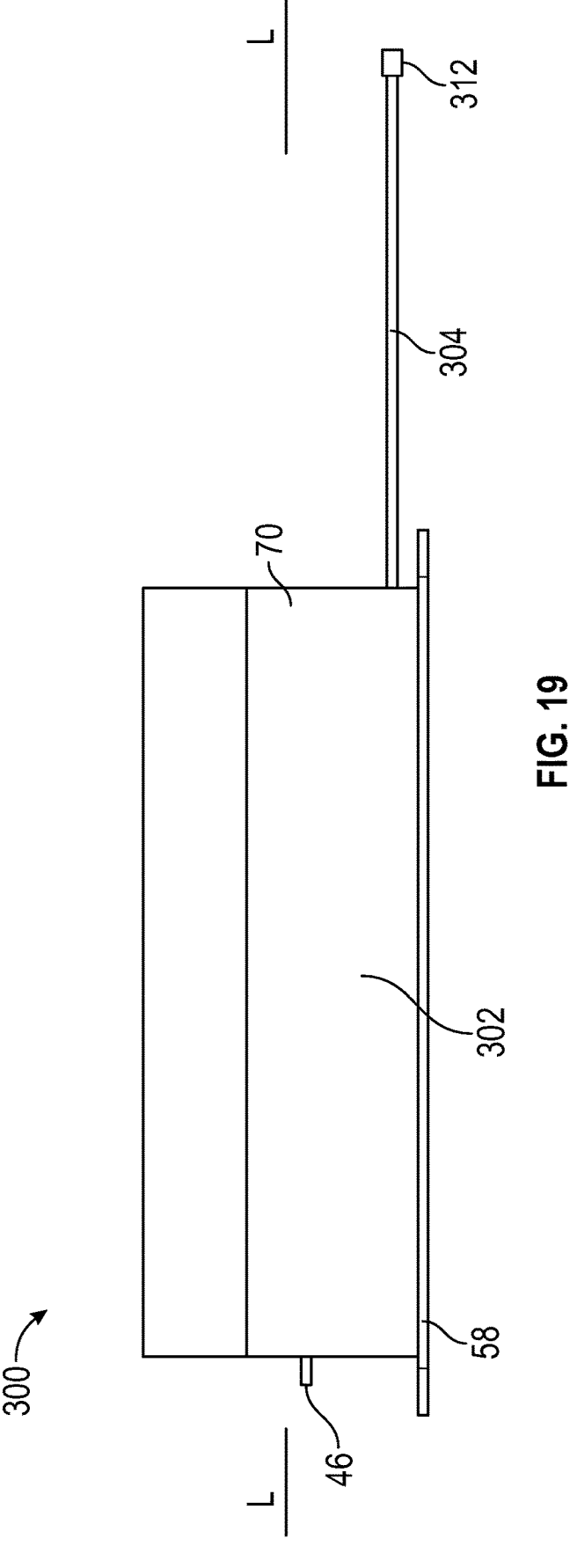
FIG. 19 is a side view of the vent register of FIG. 17.

FIG. 19 is a side view of the vent register 300 of FIG. 17 and shows the slidable filter 304 partially removed from the housing 302 of the vent register 300. FIG. 19 also shows the rotatable hinge pins 46 that support the slats 34 of the louver structure 30. The hinge pins 46 may extend outwardly from the housing 302 and need not necessarily be flush with the housing 302, but may be flush with the housing 302. By gripping the gripping portion 312, a user may slide the filter 304 along the longitudinal axis of the vent register 300 to either install the filter within the housing 302 or to remove or partially remove the filter 304 from the housing 302.

Figure 20:
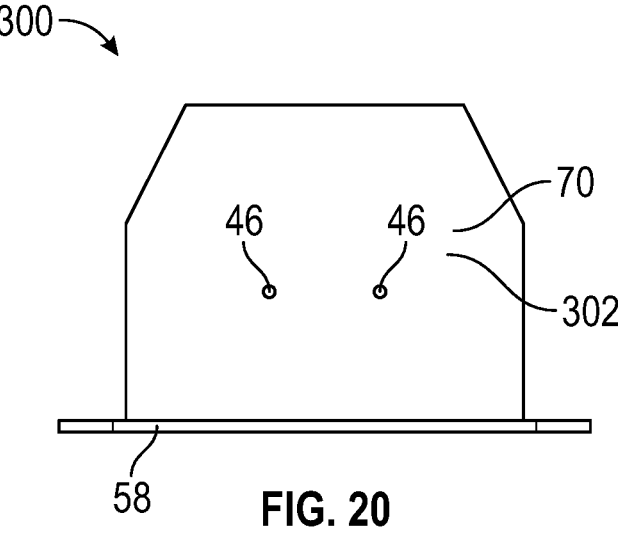
FIG. 20 is a front view of the vent register of FIG. 17.
Figure 21:
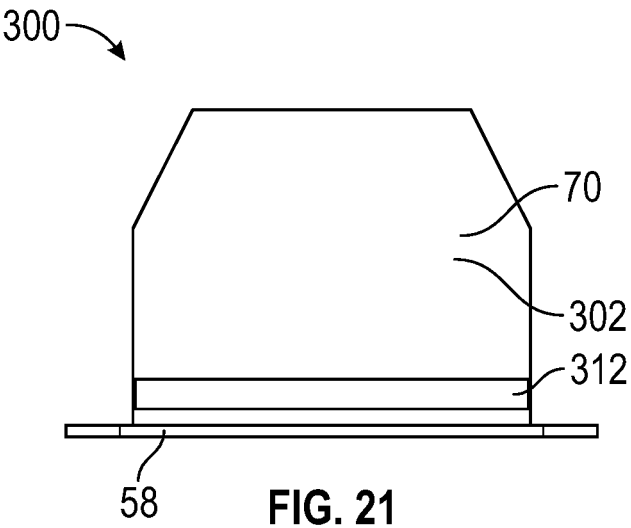
FIG. 21 is a rear view of the vent register of FIG. 17.
Figure 22:
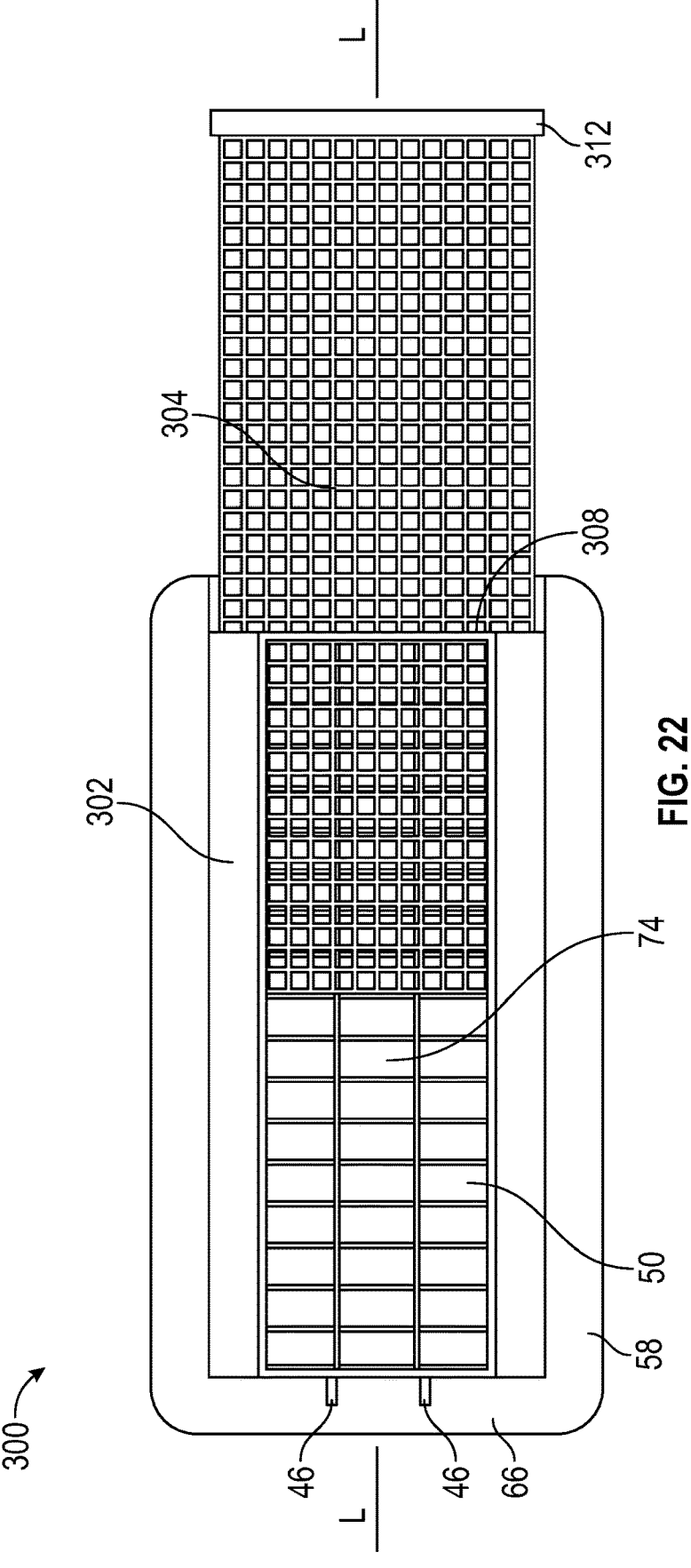
FIG. 22 is a bottom view of the vent register of FIG. 17.

FIG. 20 is a rear view of the vent register 300 of FIG. 17 showing the floor-contact flange 58, the housing 302, and the rotatable hinge pins 46. FIG. 21 is a front view of the vent register 300 of FIG. 17 showing the floor-contact flange 58, the housing 302, and the gripping portion 312 of the filter 304. FIG. 22 is a bottom view of the vent register 300 of FIG. 17 showing the floor-contact flange 58, the housing 302, the filter 304, the gripping portion 312 of the filter 304, the vanes 50, the rotatable hinge pins 46, and the slats 34 of the louver structure 30. The filter 304 may be made of mesh 126 that can vary in construction as previously described.

Figure 23:
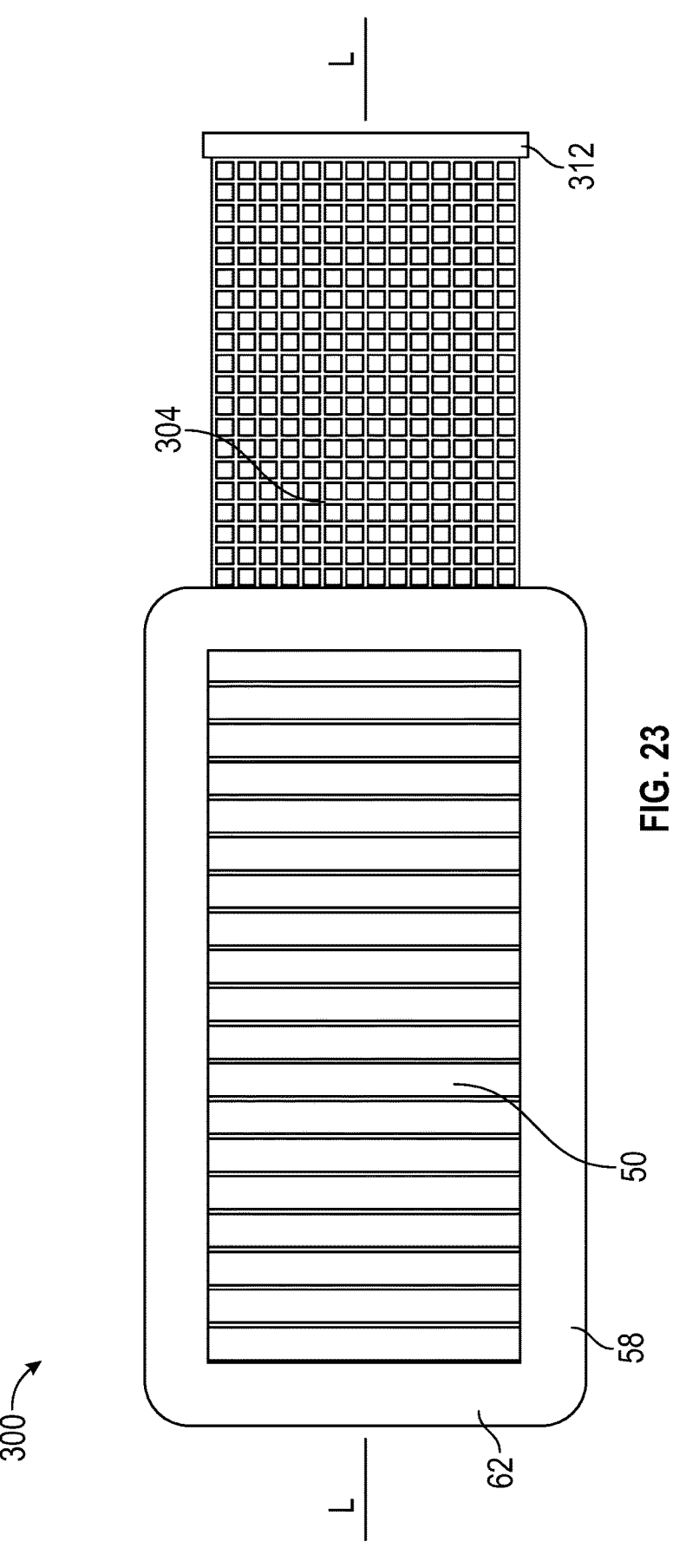
FIG. 23 is a top view of the vent register of FIG. 17.

FIG. 23 is a top view of the vent register 300 of FIG. 17 showing the panel 18, the floor-contact flange 58, the vanes 50, the first apertures 54, the filter 304, and the gripping portion 312 of the filter 304. The filter 304 slides into and out of the vent register 300 in the direction of the longitudinal axis of the vent register 300.

According to the embodiments disclosed herein, the air passing through the airflow pathway of one of the embodiments of a vent register has a pressure drop across the vent register. The pressure drop is a comparison of the air gauge pressure measured at the airflow inlet 90 with the air gauge pressure measured at the airflow outlet 94. Utilizing a filter having a mesh 126 with smaller second apertures may increase the pressure drop across the vent register. Changing the configuration of the vent register may also impact the pressure drop across the vent register. In some embodiments, the air gauge pressure measured at the airflow inlet 90 is at least 90% of the pressure at the airflow outlet 94.

Additionally, the size of the apertures and the configuration of the vent register can change the relative airflow speeds between the airflow inlet 90 of a vent register having a filter and the airflow outlet 94 of a substantially identical register that does not include a filter. In some embodiments, the airflow speed measured at the airflow inlet 90 is at least 90% of the airflow speed measured at the airflow outlet 94 of a substantially identical register that does not include a filter.

In order to further inhibit the passage of objects and entities through or around a vent register, the vent register may be affixed to a surface. For example, the vent register may be screwed, glued, nailed, or bolted to a floor surface for many purposes, including to prevent entities such as rats from moving the vent register out of the way so that the entity may pass through. An ordinarily skilled artisan will recognize other ways of affixing and securing the vent register to a surface.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed. Various features of different embodiments may be combined to form yet other embodiments.

What is claimed is:

1. A ventilation register, comprising:
   a panel having a flange and a plurality of first apertures adapted to allow airflow through the panel, with each first aperture having a diameter or dimensions sufficient to allow movement of an object or entity through that first aperture;
   a single filter integrated into the ventilation register and having a back panel, side panels and end panels, each side panel having upper and lower side panels and each end panel having upper and lower end panels, with each upper side panel and each upper end panel being inwardly angled to facilitate disposition of the ventilation register in a register boot, wherein the filter defines an internal cavity and includes a plurality of second apertures with each second aperture having a diameter of at least 1.5 millimeters, the filter being adapted to allow airflow through the filter while inhibiting a movement of the object or entity through the filter when the object or entity has a cross-sectional area that is larger than an average cross-sectional area of the plurality of second apertures;
   a plurality of longitudinal rotatable slats disposed within the internal cavity of the filter, the slats being configured to rotate about longitudinal axes supported at opposite ends by the end panels, with adjacent slats configured to define a plurality of adjustable apertures through which airflow is selectively permitted based on the rotational position of the slats, each of the longitudinal rotatable slats remains fully contained within the cavity defined by the filter when rotated to a fully open position and the airflow through the ventilation register is adjustable solely by rotation of the slats within the filter cavity and without obstructing the second apertures, with each of the first apertures and each of the adjustable apertures having a cross-sectional area that is at least ten times greater than the cross-sectional area of each of the second apertures;
   a plurality of rigid side support bars extending between the upper and lower side panels and a plurality of rigid end support bars extending between the upper and lower end panels, the side support bars and end support bars providing structural reinforcement to the filter and mechanically supporting the longitudinal rotatable slats during rotation;
   a housing with at least a portion of the housing disposed between the panel and the filter, the housing having side walls that form a hollow enclosure with front and back openings;
   wherein the upper side panels and upper end panels of the filter are solid and form at least a portion of the housing side walls such that the upper side panels and upper end panels are structurally integrated with the housing and are effectively the same component as the housing side walls;

wherein the back panel, lower side panels, and lower end panels of the filter are coupled directly to the housing side walls without substantial overlapping;

wherein the flange is positioned about a periphery of at least a portion of the side walls and defines at least a portion of the front opening; and wherein the ventilation register is adapted to be disposed in the register boot so that the ventilation register is operable to allow a flow of air through the ventilation register while inhibiting a movement of the object or entity between the ventilation register and the register boot.

2. The ventilation register of claim 1, wherein the ventilation register includes adjustable apertures operable to enable airflow to be controlled.

3. The ventilation register of claim 2, wherein the adjustable apertures are at least partially defined by rotatable slats.

4. The ventilation register of claim 2, wherein the adjustable apertures are at least partially defined by a slidable cover.

5. The ventilation register of claim 1, wherein the ventilation register includes a door or a slide operable to be selectively opened and closed in order to remove objects or entities that have been caught by the filter, wherein the door or slide is disposed in the filter.

6. The ventilation register of claim 1, wherein a removable insert comprises the filter, the insert configured to fit within the housing.

7. The ventilation register of claim 1, wherein the filter is permanently affixed to the housing or the panel.

8. The ventilation register of claim 1, wherein the panel and the filter are a monolithic piece and wherein the ventilation register is configured to be affixed to a surface.

9. The ventilation register of claim 1, wherein:

the flange is configured to contact a floor surface;

the filter is integrated with the housing;

a ventilation register height is defined as the distance between a distal edge of the panel and a distal edge of the filter;

the register boot has a boot depth measured from a floor surface to the bottom of the register boot; and the ventilation register height is less than the boot depth.

10. The ventilation register of claim 1, wherein the filter is made of a metal mesh.

11. The ventilation register of claim 10, wherein each of the first apertures has a first cross-sectional area and wherein each of the second apertures has a second cross-sectional area that is less than one one-hundredth of the first cross-sectional area.

12. The ventilation register of claim 10, wherein each of the first apertures has a first cross-sectional area and wherein each of the second apertures has a second cross-sectional area that is less than one two-hundredth of the first cross sectional area.

13. The ventilation register of claim 1, wherein the first apertures and the adjustable apertures are the same apertures.

14. The ventilation register of claim 1, wherein the register is configured such that, during normal operation, the air gauge pressure measured at the airflow inlet is at least 90% of the pressure at the airflow outlet.

15. The ventilation register of claim 1, wherein the ventilation register is configured such that, during normal operation, air speed measured at the airflow outlet is at least 90% of the air speed measured at the airflow outlet of a substantially identical ventilation register that does not include a filter.

16. The ventilation register of claim 1, wherein the ventilation register includes a battery pack, wherein the battery pack is configured to electrostatically charge or heat the filter.

17. The ventilation register of claim 1, further comprising:

a pair of hinged doors disposed on the filter and configured to be selectively opened to form an opening through which an object or entity that has entered through the first apertures but is inhibited from passing through the second apertures may be removed, wherein the pair of hinged doors are configured to meet in a closed position such that any gap between the doors or between a door and the filter is no greater than a size of the second apertures, and wherein a latch is provided to maintain the doors in the closed position during normal operation.

18. The ventilation register of claim 1, further comprising:

a sliding door system including first and second doors disposed on the filter and configured to slide relative to one another in a direction that is transverse or longitudinal with respect to a longitudinal axis of the ventilation register, the sliding door system being operable between a closed position that inhibits passage of an object or entity and an open position that allows removal of an object or entity that has entered through the first apertures but is inhibited from passing through the second apertures.

* * * * *